US011921199B2

(12) United States Patent
Hooper

(10) Patent No.: US 11,921,199 B2
(45) Date of Patent: *Mar. 5, 2024

(54) SONAR BEAM FOOTPRINT PRESENTATION

(71) Applicant: Navico, Inc., Tulsa, OK (US)

(72) Inventor: Mathew J. Hooper, Mangere Bridge (NZ)

(73) Assignee: NAVICO, INC., Tulsa, OK (US)

(*) Notice: Subject to any disclaimer, the term of this patent is extended or adjusted under 35 U.S.C. 154(b) by 65 days.

This patent is subject to a terminal disclaimer.

(21) Appl. No.: 17/179,460

(22) Filed: Feb. 19, 2021

(65) Prior Publication Data

US 2022/0268926 A1 Aug. 25, 2022

(51) Int. Cl.
G01S 15/89 (2006.01)
G01S 7/521 (2006.01)
(Continued)

(52) U.S. Cl.
CPC .............. *G01S 15/89* (2013.01); *G01S 7/521* (2013.01); *G01S 7/6218* (2013.01);
(Continued)

(58) Field of Classification Search
CPC .......... G01S 15/89; G01S 15/96; G01S 7/521; G01S 7/6218; G01S 7/6263; G10K 11/004
See application file for complete search history.

(56) References Cited

U.S. PATENT DOCUMENTS 4,425,635 A 1/1984 Yamamoto et al.
5,327,398 A 7/1994 Wansley et al.
(Continued)

FOREIGN PATENT DOCUMENTS

AU 2019203322 A1 12/2019
CA 3042656 A1 11/2019
(Continued)

OTHER PUBLICATIONS

"Teledyne SeaBotix—SmartFlight 2.0"; YouTube; Apr. 13, 2018; retrieved from https://www.youtube.com/watch?v=xFJ2OCKIXwc.
(Continued)

*Primary Examiner* — Isam A Alsomiri
*Assistant Examiner* — Joseph C Fritchman
(74) *Attorney, Agent, or Firm* — Nelson Mullins Riley & Scarborough LLP

(57) ABSTRACT

Systems and methods for providing a sonar beam footprint are detailed herein. A system for presenting marine data includes at least one sonar transducer associated with a watercraft, a display, processor(s), and memory including computer program code. The sonar transducer emits sonar beams into an underwater environment that define a beam shape. The program code, when executed, causes, on the display, presentation of a chart and a representation of the watercraft; determines a depth corresponding to a bottom surface of a body of water at a current location of the watercraft; and determines, based on the depth and the beam shape, a sonar beam footprint corresponding to a projection of the beam shape at the depth. The program code further causes, on the display, presentation of the sonar beam footprint on the chart so as to visually indicate sonar beam coverage.

20 Claims, 13 Drawing Sheets

(51) Int. Cl.
  *G01S 7/62* (2006.01)
  *G01S 15/96* (2006.01)
  *G10K 11/00* (2006.01)

(52) U.S. Cl.
  CPC .......... *G10K 11/004* (2013.01); *G01S 7/6263* (2013.01); *G01S 15/96* (2013.01)

(56) References Cited

U.S. PATENT DOCUMENTS

| | | |
|---|---|---|
| 5,537,380 A | 7/1996 | Sprankle, Jr. et al. |
| 5,805,528 A | 9/1998 | Hamada et al. |
| 6,520,105 B2 | 2/2003 | Koda et al. |
| 7,355,924 B2 | 4/2008 | Zimmerman et al. |
| 7,606,114 B2 | 10/2009 | Bachelor et al. |
| 8,456,956 B2 | 6/2013 | Wang et al. |
| 8,645,012 B2 | 2/2014 | Salmon et al. |
| 8,761,976 B2 | 6/2014 | Salmon et al. |
| 9,132,900 B2 | 9/2015 | Salmon et al. |
| 9,135,731 B2 | 9/2015 | Lauenstein et al. |
| 9,739,884 B2 | 8/2017 | Proctor et al. |
| 9,784,832 B2 | 10/2017 | Proctor et al. |
| 9,840,312 B1 | 12/2017 | Clark |
| 10,012,731 B2 | 7/2018 | Pelin et al. |
| 10,019,002 B2 | 7/2018 | Harnett et al. |
| 10,247,832 B2 | 4/2019 | Serafino et al. |
| 10,365,366 B2 | 7/2019 | Lauenstein |
| 10,408,933 B1 | 9/2019 | Dehart et al. |
| 10,481,259 B2 | 11/2019 | Langford-Wood |
| 10,545,235 B2 | 1/2020 | Pelin et al. |
| 10,585,190 B2 | 3/2020 | Smith et al. |
| 2005/0099887 A1 | 5/2005 | Zimmerman et al. |
| 2009/0037040 A1 | 2/2009 | Salmon et al. |
| 2010/0284248 A1 | 11/2010 | Wang et al. |
| 2013/0215719 A1 | 8/2013 | Betts et al. |
| 2014/0013270 A1 | 1/2014 | Thomas et al. |
| 2014/0013276 A1 | 1/2014 | Butterworth |
| 2014/0071059 A1 | 3/2014 | Girault |
| 2014/0096060 A1 | 4/2014 | Thomas et al. |
| 2014/0336854 A1 | 11/2014 | Salmon et al. |
| 2015/0142211 A1 | 5/2015 | Shehata et al. |
| 2015/0369908 A1 | 12/2015 | Zimmerman et al. |
| 2016/0054733 A1 | 2/2016 | Hollida et al. |
| 2016/0061951 A1 | 3/2016 | Brown et al. |
| 2016/0214715 A1 | 7/2016 | Meffert |
| 2016/0259049 A1 | 9/2016 | Proctor et al. |
| 2016/0259050 A1 | 9/2016 | Proctor et al. |
| 2016/0259051 A1 | 9/2016 | Proctor et al. |
| 2016/0259052 A1 | 9/2016 | Kirmani et al. |
| 2016/0306040 A1 | 10/2016 | Hunt et al. |
| 2016/0341827 A1 | 11/2016 | Horner et al. |
| 2017/0082739 A1 | 3/2017 | Homer |
| 2017/0212230 A1 | 7/2017 | Wigh et al. |
| 2017/0235308 A1 | 8/2017 | Gordon et al. |
| 2017/0242113 A1 | 8/2017 | Lauenstein |
| 2017/0285167 A1 | 10/2017 | Proctor et al. |
| 2017/0363739 A1 | 12/2017 | Lauenstein |
| 2017/0371039 A1 | 12/2017 | Clark et al. |
| 2018/0100922 A1 | 4/2018 | Wigh et al. |
| 2018/0107210 A1 | 4/2018 | Harnett et al. |
| 2018/0120431 A1* | 5/2018 | Pelin .................. G10K 11/006 |
| 2018/0123213 A1 | 5/2018 | Grede et al. |
| 2018/0129213 A1 | 5/2018 | Pelin et al. |
| 2018/0288990 A1 | 10/2018 | Laster et al. |
| 2018/0313953 A1 | 11/2018 | Gatland |
| 2018/0329056 A1 | 11/2018 | Smith et al. |
| 2019/0346567 A1* | 11/2019 | Laster .................. G01S 19/48 |
| 2019/0353744 A1* | 11/2019 | Laster .................. G01S 3/801 |
| 2019/0384284 A1* | 12/2019 | Harnett .................. B64D 47/08 |
| 2020/0241132 A1* | 7/2020 | Laster .................. G01S 7/539 |
| 2020/0241133 A1 | 7/2020 | Laster et al. |
| 2020/0256967 A1 | 8/2020 | Wigh et al. |

FOREIGN PATENT DOCUMENTS

| | | |
|---|---|---|
| EP | 3572837 A1 | 11/2019 |
| KR | 20160121915 A | 10/2016 |
| WO | WO 1997/004334 A1 | 2/1997 |
| WO | WO 2006/017511 A2 | 2/2006 |
| WO | WO 2013/126761 A1 | 8/2013 |
| WO | WO 2014/144471 A1 | 9/2014 |
| WO | WO 2016/010619 A1 | 1/2016 |
| WO | WO 2016/205938 A1 | 12/2016 |
| WO | WO 2018/201097 A2 | 11/2018 |
| WO | WO 2020/021936 A1 | 1/2020 |

OTHER PUBLICATIONS

"SAMM"; *Oceanic Imaging Consultants;* retrieved Feb. 12, 2021 from https://www.geomatrix.co.uk/software/oceanographic-and-hydrographic/samm/.

WASSP Multibeam; retrieved from <https://wassp.com/video/26/WASSP-S3-Demo-WEB.mp4> May 17, 2018.

Ellison, Ben; Panbo; The Marine Electronics Hub; "Garmin BlueChart g2 & g2 Vision 2010, lots new?" Mar. 16, 2010; retrieved from <https://www.panbo.com/garmin-bluechart-g2-g2-vision-2010-lots-new>.

Ellison, Ben; Panbo; The Marine Electronics Hub; "Maptech i3 fishfinder road trip" Jun. 15, 2005; retrieved from <https://www.panbo.com/maptech-i3-fishfinder-road-trip>.

ADS, Inc .; "SeaBotix—Underwater Remotely Operated Vehicles (ROVs)"; *YouTube,* Jul. 16, 2014; retrieved from https://www.youtube.com/watch?v=hkqJh5j6eQA.

Teledyne Marine; "SmartFlight 2.0 powered by Greensea"; retrieved Jun. 19, 2019 from http://www.teledynemarine.com/smartflight2-0?ProductLineID=112.

"LED Programmable Message Pocket Fan & Rave Toy"; retrieved Jan. 31, 2019 from https://www.amazon.com/LED-Programmable-Message-Pocket-Rave/dp/B002FWOYG2.

AguaDrone—The World's First Drone with a Fish Finder! website visited Oct. 25, 2016 (10 pgs.) https://www.aguadrone.com/.

AeroKontiki—Introducing the world's first autopilot fishing drone kontiki website visited Oct. 25, 2016 (4 pgs.) http://www.aerokontiki.com/.

DIY Drones—The Leading Community for Personal UAVs—Home website visited Oct. 25, 2016 (9 pgs.) www.diydrones.com.

DIY Drones—The Leading Community for Personal UAVs—My Blog Automated Precision Landing on a (stationary) Boat website visited Oct. 25, 2016 (6 pgs.) www.diydrones.com/profiles/blogs/automated-precision-landing-on-a-stationary-boat.

Visual Aerials—Flying Off a Boat—Mark and Romeo's Aerial Adventures website visited Oct. 25, 2016 (3 pgs.) http://www.visual-aerials.com/flying-off-a-boat.html.

Unmanned Marine Systems USV Website visited Oct. 26, 2016 (12 pgs.) http://www.unmannedsystemstechnology.com/company/autonomous-surface-vehicles-ltd/.

"Lowrance HDS-7 Gen1;" *Review Marine;* retrieved Feb. 17, 2021 from https://reviewmarine.com/model/lowrance-hds-7-gen1/.

"What is Fish Finder A-Scope? Why do I need it? How to Use A-Scope SIMRAD Evo2, Mike Smedley;" *YouTube;* Jul. 28, 2015; retrieved Feb. 17, 2021 from https://www.youtube.com/watch?v=K35DFocvlQg.

"SIMRAD ES80;" Kongsberg; retrieved Jun. 24, 2021 from https://www.kongsberg.com/maritime/products/commercial-fisheries/echo-sounders/es80/.

Color Video Sounder; Model FCV-30; Furuno; 2018; retrieved Jun. 24, 2021 from https://web.archive.org/web/20180603223230/http://www.furuno.com/en/products/fishfinder/FCV-30.

"FCV30BB;" Furuno; retrieved Jun. 24, 2021 from https://www.furunousa.com/en/products/fcv30bb.

* cited by examiner

SONAR BEAM FOOTPRINT PRESENTATION

FIELD OF THE INVENTION

Embodiments of the present invention relate generally to presentation of marine data, and more particularly, to providing for improved display features regarding sonar data on nautical charts.

BACKGROUND OF THE INVENTION

Sonar (SOund Navigation And Ranging) has long been used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater. Sonar transducer elements, or simply transducers, may convert electrical energy into sound or vibrations at a particular frequency. A sonar sound beam is transmitted into and through the water and is reflected from objects it encounters (e.g., fish, structure, bottom surface of the water, etc.). The transducer may receive the reflected sound (the "sonar returns") and convert the sound energy into electrical energy. Based on the known speed of sound, it is possible to determine the distance to and/or location of the waterborne or underwater objects.

The sonar return signals can also be processed to be presented on a display, giving the user a "picture" or image of the underwater environment. Notably, however, it can be difficult to understand the coverage of the sonar in relation to the body of water, such as to understand where objects in the sonar image are in the real world.

BRIEF SUMMARY OF THE INVENTION

As noted above, it can be difficult to determine the real world sonar coverage provided by the various sonar transducers of the watercraft. The sonar beam shape (of the sonar beams emitting from the sonar transducer(s)) may be unknown or difficult to determine by the user, as well as the understanding of how that sonar beam shape fits within the underwater environment. Accordingly, the corresponding coverage of the sonar beams may be difficult to understand, making it difficult to link the objects in the sonar imagery with their actual location within the body of water.

Some watercraft users may utilize nautical charts to provide for navigation and depth readings regarding a body of water. Such charts, which can be stored in memory, can be displayed, such as on a marine electronic device of the watercraft. In some cases, the location of the watercraft can be depicted within the displayed nautical chart, giving the user a general sense of where they are on the body of water. Further, the corresponding orientation of the watercraft with respect to the chart may be indicated. However, it can still be difficult to understand the relative relation of the sonar coverage provided by the sonar transducers on the watercraft.

Some embodiments of the present invention aim to provide useful information that will aid the user in determining and understanding the sonar coverage of the underwater environment. In some embodiments of the present invention, information regarding the sonar beam coverage from a sonar transducer may be presented on the nautical chart to visually indicate the sonar coverage. The orientation and/or relative position of the sonar transducer with respect to watercraft may be accounted for in the presentation of the sonar beam overlay presented on the chart. For example, a forward facing transducer may correspond to a triangle shaped sonar beam overlay extending outwardly in front of the watercraft.

Notably, depending on the transducer configuration (e.g., shape, array characteristics, frequency, among other things) different sonar beam shapes may be emitted for different transducers (and sometimes different sonar beam shapes may be emitted from the same transducer or transducer assembly depending on various configurations or functionality). The sonar beam shape may accordingly be accounted for and displayed in the sonar beam overlay presented on the chart.

Further, the depth of the bottom surface may also affect the overall coverage of the sonar beam(s) at a given location. Accordingly, in some embodiments, the relative size of the sonar beam overlay with respect to the watercraft may vary and correspond with the determined depth at the location—thereby providing a visual indication of the sonar beam footprint on the bottom surface and, thus, a visual indication of the general sonar beam coverage area for the underwater environment. In some embodiments, a trail of such sonar beam footprints may be presented on the chart, such as to indicate what part of the bottom surface of the body of water has been covered by sonar imagery.

In some embodiments, indications of the location of various objects (e.g., fish, structure, etc.) within the sonar data could be presented on the nautical chart, such as within the sonar beam overlay. Additionally, in some embodiments, tracking of the object may occur as time progresses, which may cause the indicator to move within the sonar beam overlay.

Accordingly, various beneficial features can be provided to a user to help better understand and utilize the sonar data and its corresponding coverage of the underwater environment. Such information may be included with a nautical chart to enable easier determination by the user of the real world positioning of sonar coverage.

In an example embodiment, a system for presenting marine data is provided. The system comprises at least one sonar transducer associated with a watercraft. The at least one sonar transducer is configured to emit one or more sonar beams into an underwater environment of a body of water in a direction relative to the watercraft. The one or more sonar beams are each emitted according to a beam shape. The system further includes a display; one or more processors; and a memory including computer program code. The computer program code is configured to, when executed, cause the one or more processors to cause, on the display, presentation of a chart including at least a portion of the body of water; cause, on the display, presentation of a representation of the watercraft at a position in the chart corresponding to a current location of the watercraft; determine a depth corresponding to a bottom surface of the body of water at the current location of the watercraft; determine, based on the determined depth and the beam shape corresponding to the at least one sonar transducer, a sonar beam footprint corresponding to a projection of the beam shape at the determined depth; and cause, on the display, presentation of the sonar beam footprint on the chart and relative to the representation of the watercraft so as to visually indicate sonar beam coverage of the at least one sonar transducer relative to the watercraft and within the underwater environment.

In some embodiments, the sonar beam footprint is a first sonar beam footprint and the current location is a first location. The computer program code is further configured to, when executed, cause the one or more processors to determine, in an instance in which the watercraft has moved to a second location, a second depth corresponding to the bottom surface of the body of water at the second location; determine, based on the determined second depth and the beam shape corresponding to the at least one sonar transducer, a second sonar beam footprint corresponding to a projection of the beam shape at the determined second depth; and cause, on the display, presentation of the second sonar beam footprint on the chart and relative to the representation of the watercraft. In some embodiments, the computer program code is further configured to, when executed, cause the one or more processors to remove or cease presentation on the display of the first sonar beam footprint.

In some embodiments, the position in the chart is a first position in the chart. The computer program code is further configured to, when executed, cause the one or more processors to cause, on the display, presentation of a trail of sonar beam footprint coverage from the first position in the chart to a second position in the chart corresponding to the second location of the watercraft.

In some embodiments, the sonar beam footprint is presented in one of highlight form, a different color, or a pattern on the chart.

In some embodiments, the computer program code is further configured to, when executed, cause the one or more processors to determine the sonar beam footprint further based on an operating frequency of the at least one sonar transducer.

In some embodiments, the computer program code is further configured to, when executed, cause the one or more processors to: determine the sonar beam footprint further based the direction relative to the watercraft that the at least one sonar transducer is pointing; and cause, on the display, presentation of the sonar beam footprint on the chart and relative to the representation of the watercraft further based on the direction relative to the watercraft that the at least one sonar transducer is pointing.

In some embodiments, the at least one sonar transducer comprises a first sonar transducer and a second sonar transducer. The first sonar transducer is configured to emit one or more first sonar beams and the second sonar transducer is configured to emit one or more second sonar beams. Each of the one or more first sonar beams are emitted according to a first beam shape. Each of the one or more second sonar beams are emitted according to a second beam shape. The computer program code is further configured to, when executed, cause the one or more processors to determine one of the first sonar transducer or the second sonar transducer; and determine a first sonar beam footprint in an instance in which the first sonar transducer is determined and a second sonar beam footprint in an instance in which the second sonar transducer is determined. The first sonar beam footprint is different than the second sonar beam footprint. The computer code is further configured to, when executed, cause the one or more processors to cause, on the display, presentation of the first sonar beam footprint on the chart and relative to the representation of the watercraft in an instance in which the first sonar transducer is determined and cause, on the display, presentation of the second sonar beam footprint on the chart and relative to the representation of the watercraft in an instance in which the second sonar transducer is determined.

In some embodiments, the at least one sonar transducer comprises a first sonar transducer and a second sonar transducer. The first sonar transducer is configured to emit one or more first sonar beams and the second sonar transducer is configured to emit one or more second sonar beams. Each of the one or more first sonar beams are emitted according to a first beam shape. Each of the one or more second sonar beams are emitted according to a second beam shape. The computer program code is further configured to, when executed, cause the one or more processors to determine a first sonar beam footprint corresponding to the first sonar transducer and a second sonar beam footprint corresponding to the second sonar transducer. The first sonar beam footprint is different than the second sonar beam footprint. The computer program code is further configured to, when executed, cause the one or more processors to cause, on the display, presentation of the first sonar beam footprint on the chart and relative to the representation of the watercraft and presentation on the display of the second sonar beam footprint on the chart and relative to the representation of the watercraft simultaneously.

In some embodiments, the computer program code is further configured to, when executed, cause the one or more processors to determine the depth corresponding to the bottom surface of the body of water at the current location of the watercraft based on sonar data obtained using the at least one sonar transducer.

In some embodiments, the computer program code is further configured to, when executed, cause the one or more processors to determine the depth corresponding to the bottom surface of the body of water at the current location of the watercraft based on chart data.

In some embodiments, the computer program code is further configured to, when executed, cause the one or more processors to determine a zoom level of the chart being presented on the display; and adjust a size of the sonar beam footprint based on the zoom level of the chart for presentation of the sonar beam footprint on the chart at the zoom level.

In some embodiments, the computer program code is further configured to, when executed, cause the one or more processors to cause, on the display, presentation of an indicator within the sonar beam footprint. The indicator corresponds to an object within sonar data received by the at least one sonar transducer at the current location. In some embodiments, the indicator is presented at an indicator position within the sonar beam footprint and relative to the representation of the watercraft, wherein the indicator position corresponds to an actual position of the object relative to the watercraft. In some embodiments, the computer program code is further configured to, when executed, cause the one or more processors to track the object as additional sonar data is captured by the at least one sonar transducer and cause, on the display, presentation of the indicator at an updated indicator position within the sonar beam footprint as the position of the object changes within the sonar beam footprint.

In some embodiments, the at least one sonar transducer comprises at least one of a linear downscan sonar transducer, a conical downscan sonar transducer, a sonar transducer array, or a sidescan sonar transducer.

In another example embodiment, a marine electronic device for presenting marine data is provided. The marine electronic device comprises a display; one or more processors; and a memory including computer program code. The computer program code is configured to, when executed, cause the one or more processors to cause, on the display, presentation of a chart including at least a portion of a body of water; cause, on the display, presentation of a representation of a watercraft at a position in the chart corresponding to a current location of the watercraft; determine a depth corresponding to a bottom surface of the body of water at the current location of the watercraft; and determine, based on the determined depth and a beam shape corresponding to at least one sonar transducer associated with the watercraft, a sonar beam footprint corresponding to a projection of the beam shape at the determined depth. The at least one sonar transducer is configured to emit one or more sonar beams into an underwater environment of the body of water in a direction relative to the watercraft. The one or more sonar beams are each emitted according to the beam shape. The computer program code is further configured to, when executed, cause the one or more processors to cause, on the display, presentation of the sonar beam footprint on the chart and relative to the representation of the watercraft so as to visually indicate sonar beam coverage of the at least one sonar transducer relative to the watercraft and within the underwater environment.

In some embodiments, the sonar beam footprint is a first sonar beam footprint and the current location is a first location. The computer program code is further configured to, when executed, cause the one or more processors to determine, in an instance in which the watercraft has moved to a second location, a second depth corresponding to the bottom surface of the body of water at the second location; determine, based on the determined second depth and the beam shape corresponding to the at least one sonar transducer, a second sonar beam footprint corresponding to a projection of the beam shape at the determined second depth; and cause, on the display, presentation of the second sonar beam footprint on the chart and relative to the representation of the watercraft.

In yet another example embodiment a method for presenting marine data is provided. The method comprises causing, on a display, presentation of a chart including at least a portion of a body of water; causing, on the display, presentation of a representation of a watercraft at a position in the chart corresponding to a current location of the watercraft; determining a depth corresponding to a bottom surface of the body of water at the current location of the watercraft; and determining, based on the determined depth and a beam shape corresponding to at least one sonar transducer associated with the watercraft, a sonar beam footprint corresponding to a projection of the beam shape at the determined depth. The at least one sonar transducer is configured to emit one or more sonar beams into an underwater environment of the body of water in a direction relative to the watercraft. The one or more sonar beams are each emitted according to the beam shape. The method further comprises causing, on the display, presentation of the sonar beam footprint on the chart and relative to the representation of the watercraft so as to visually indicate sonar beam coverage of the at least one sonar transducer relative to the watercraft and within the underwater environment.

In some embodiments, the sonar beam footprint is a first sonar beam footprint and the current location is a first location. The method further comprises determining, in an instance in which the watercraft has moved to a second location, a second depth corresponding to the bottom surface of the body of water at the second location; determining, based on the determined second depth and the beam shape corresponding to the at least one sonar transducer, a second sonar beam footprint corresponding to a projection of the beam shape at the determined second depth; and causing, on the display, presentation of the second sonar beam footprint on the chart and relative to the representation of the watercraft.

BRIEF DESCRIPTION OF THE DRAWINGS

Figure 1:
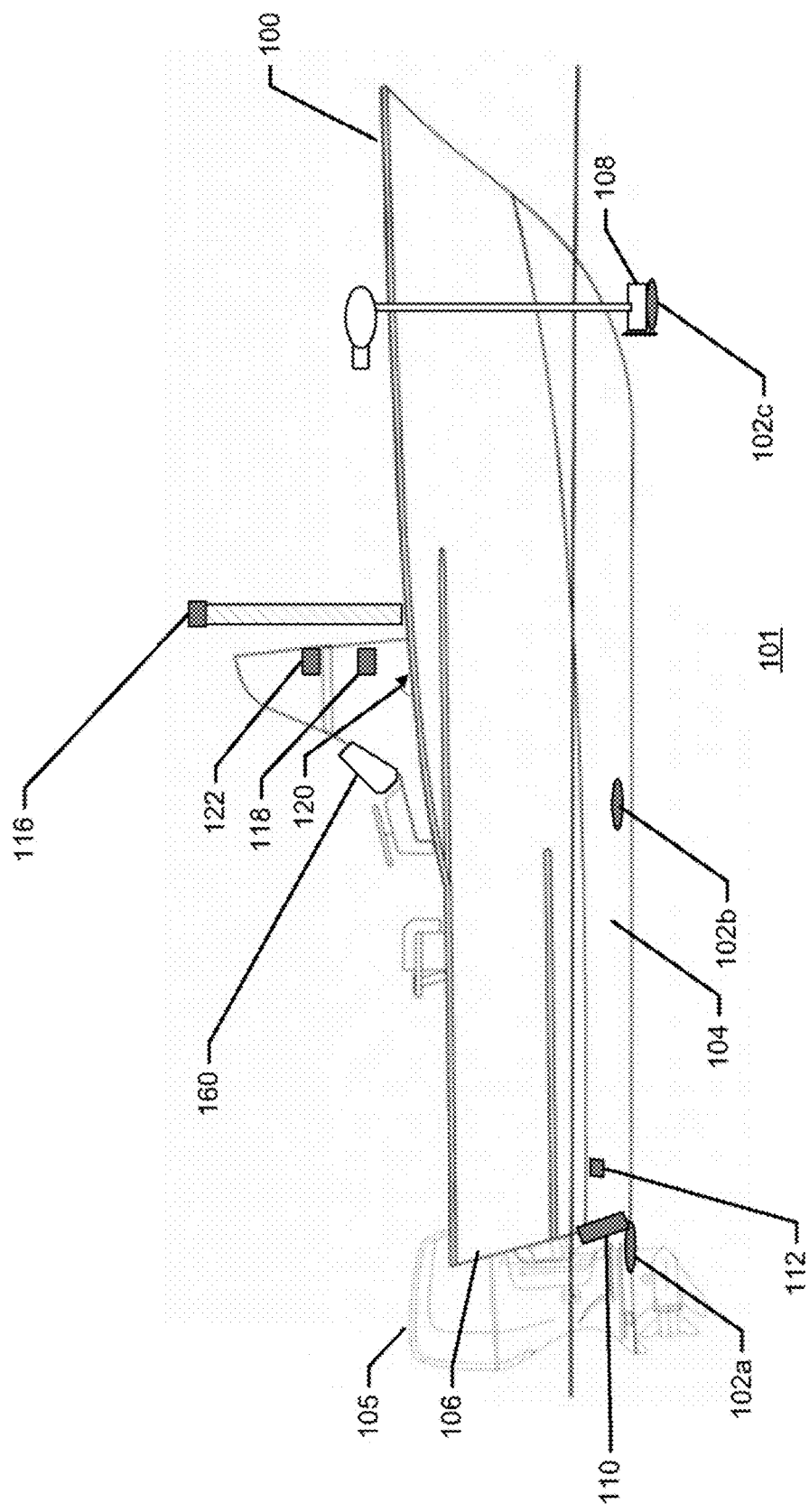
Figure 2:
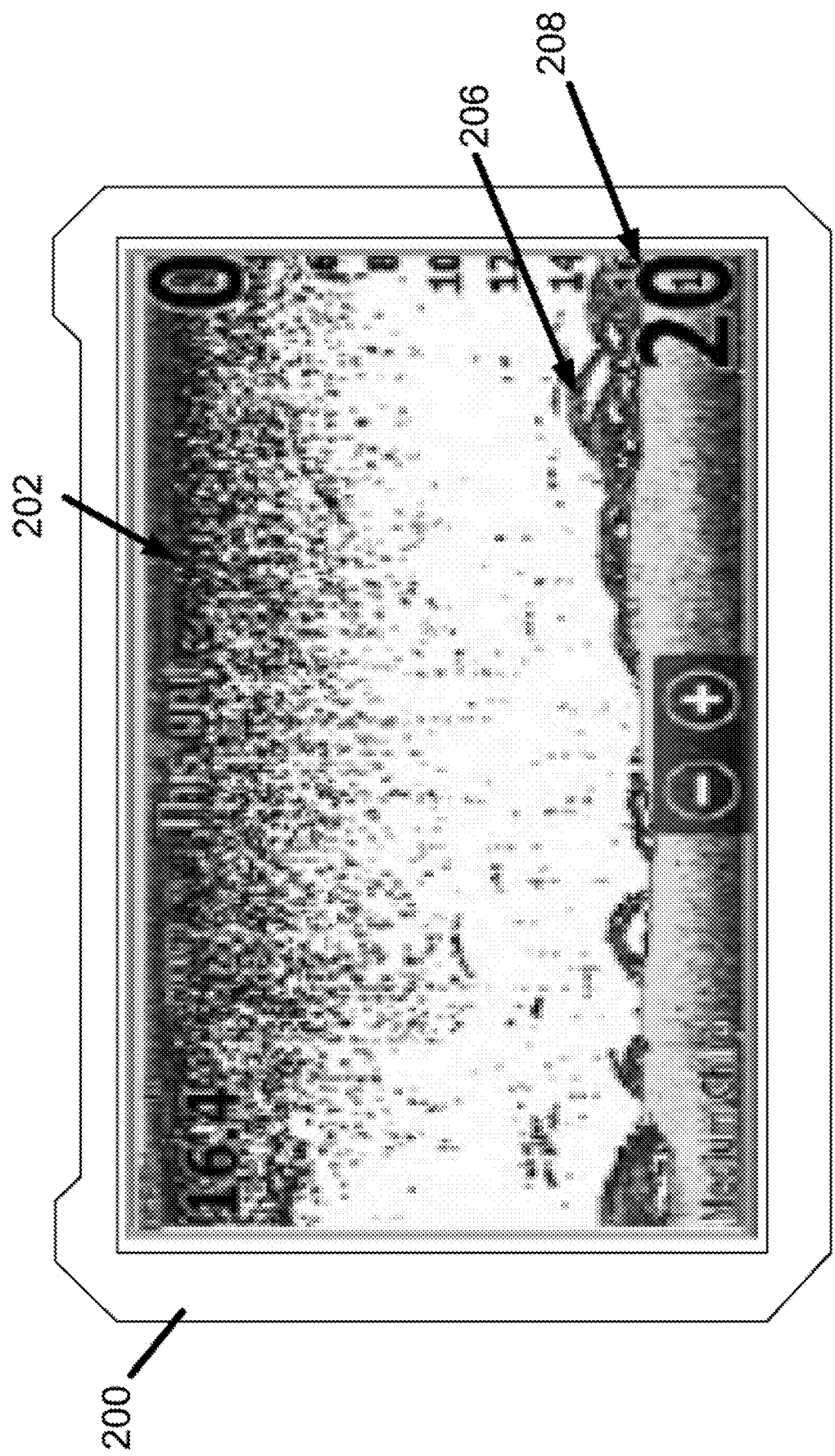
Figure 3:
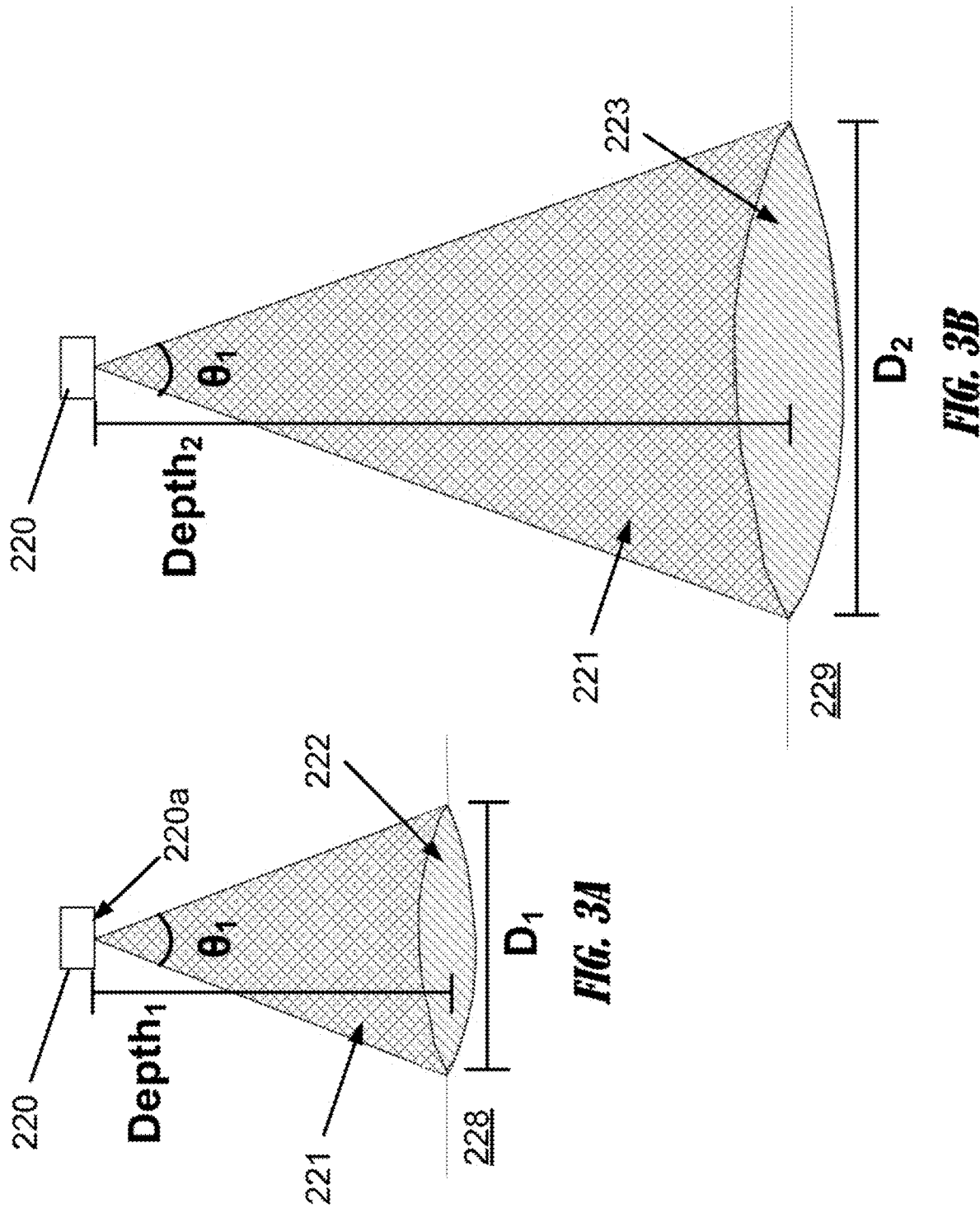
Figure 4:
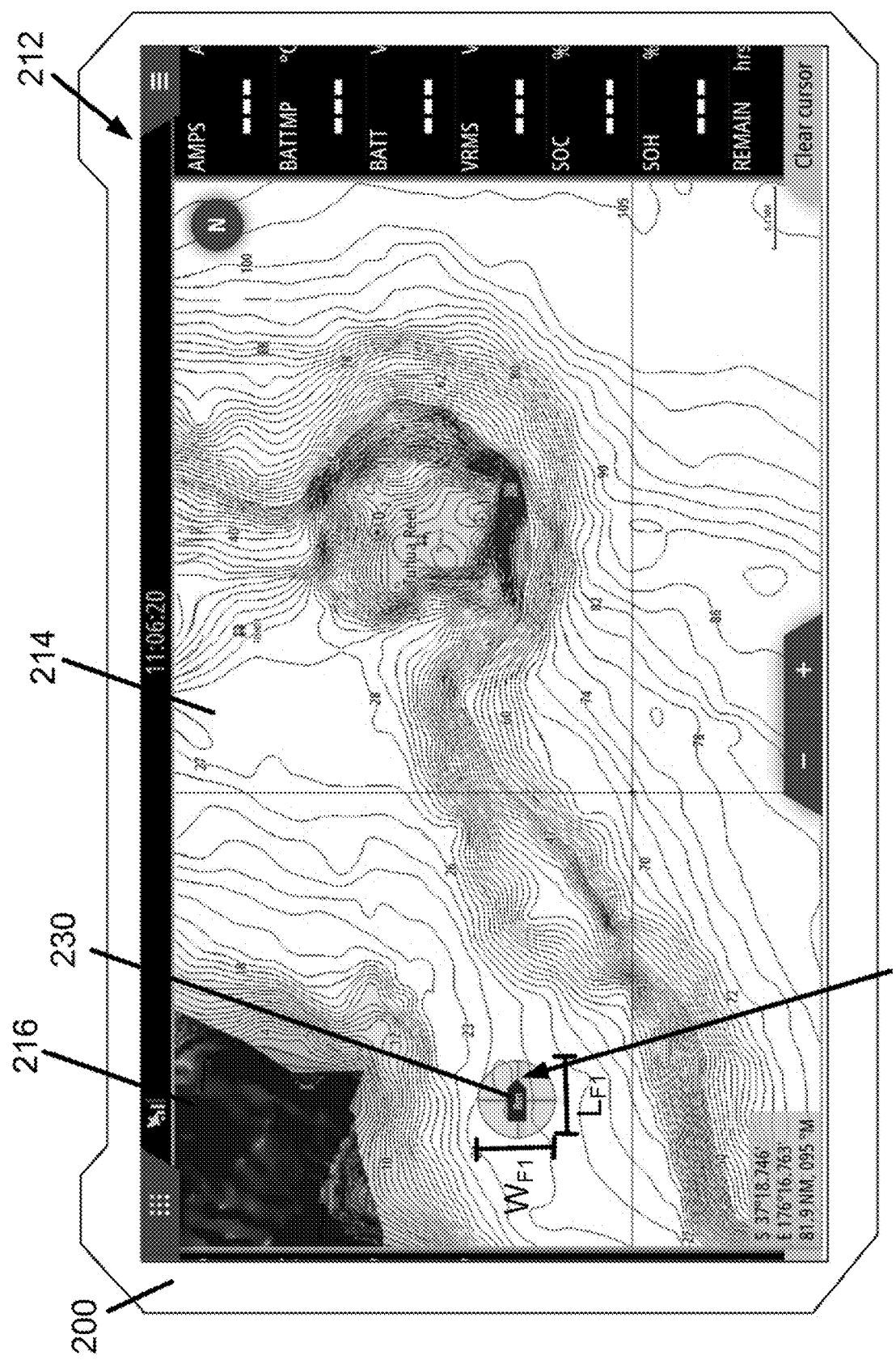
Figure 5:
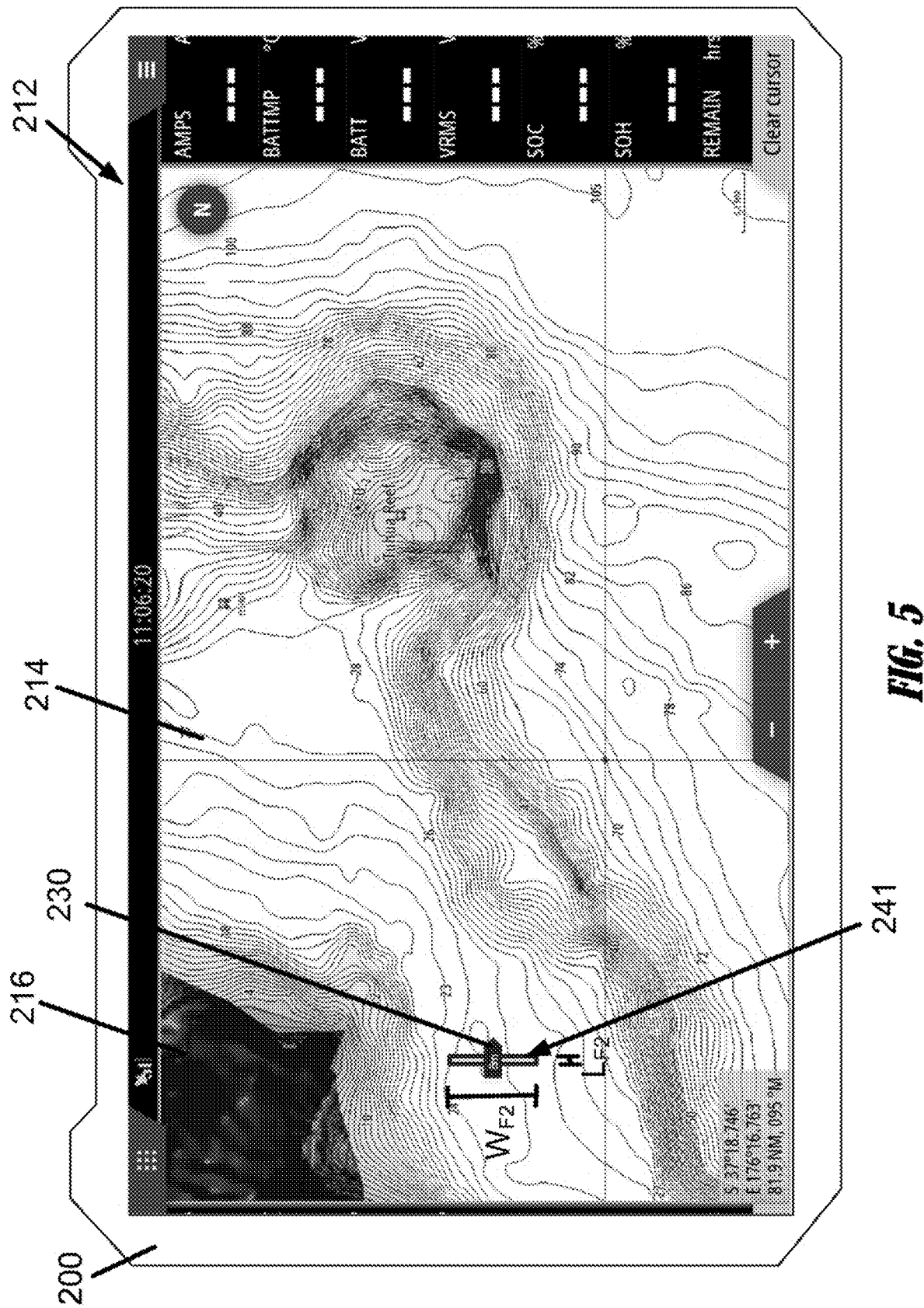
Figure 6:
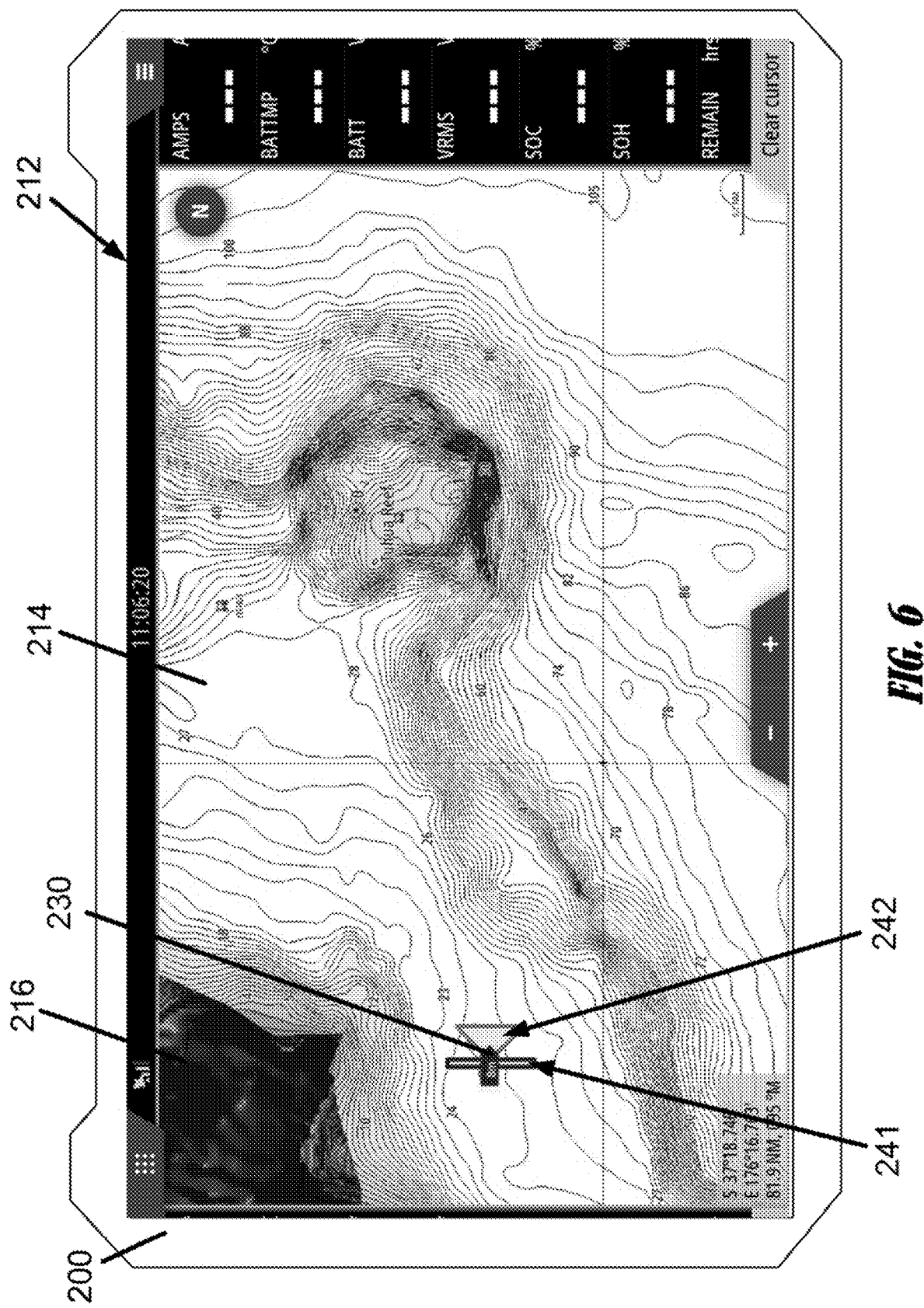
Figure 7:
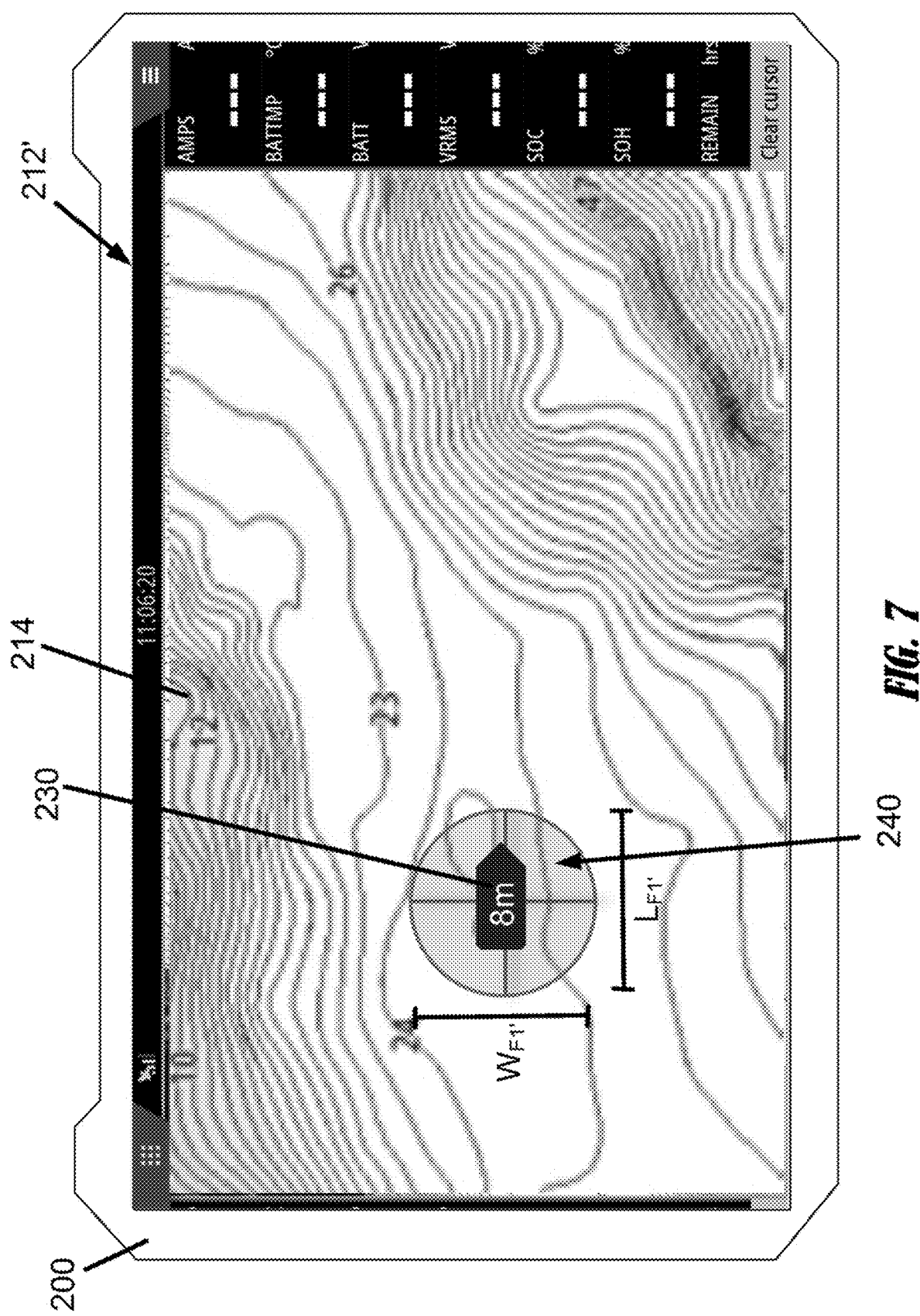
Figure 8:
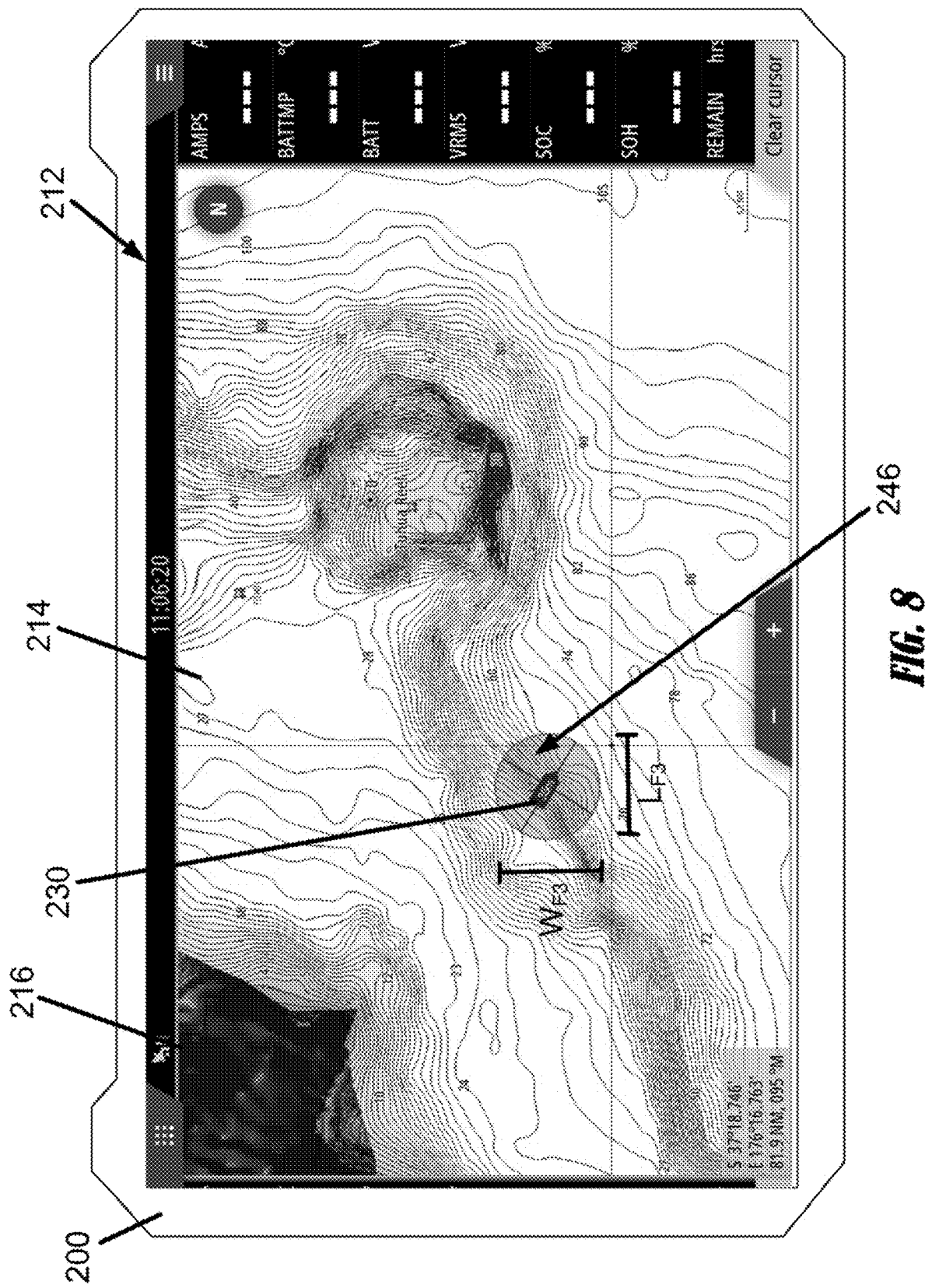
Figure 9:
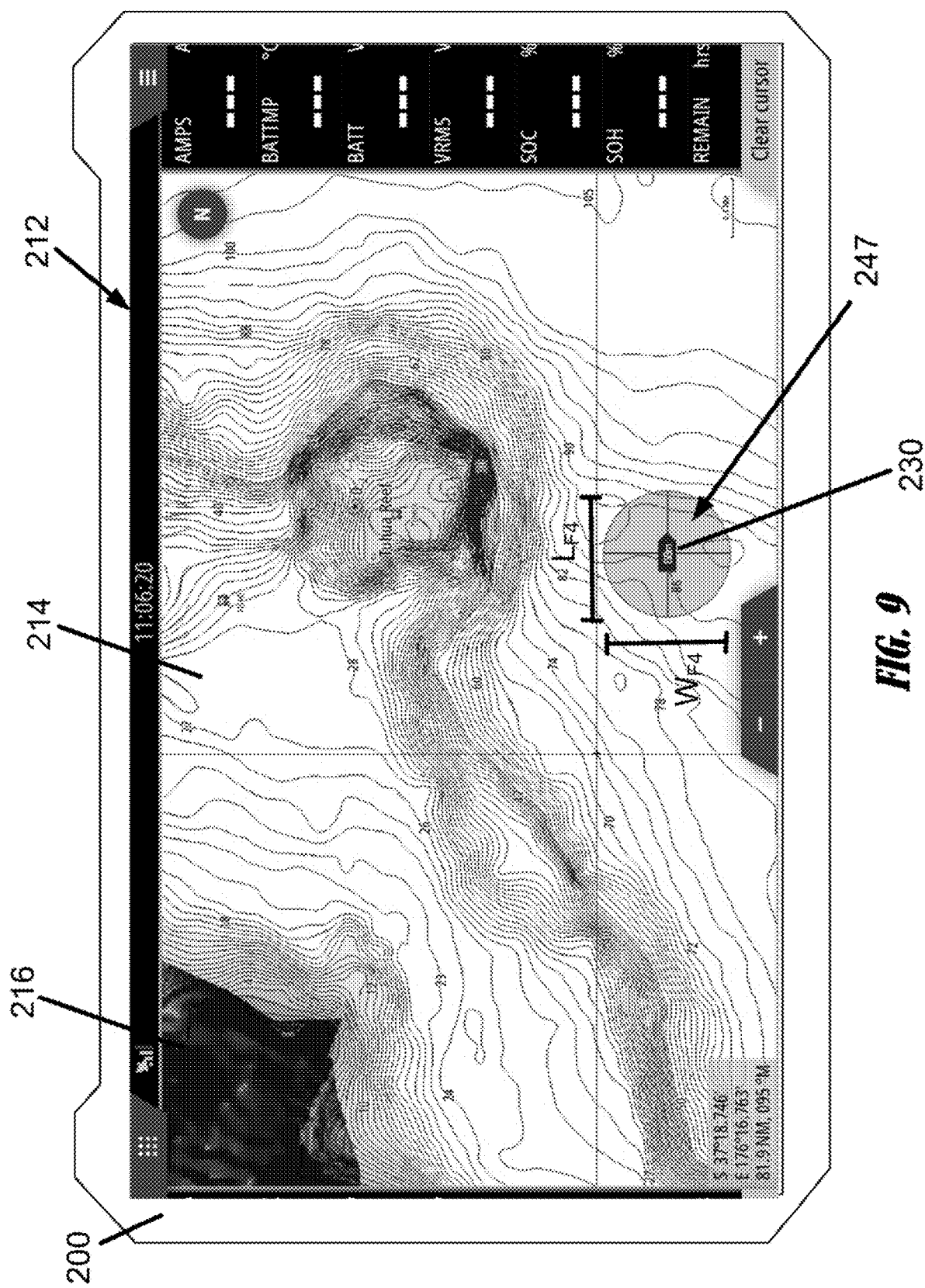
Figure 10:
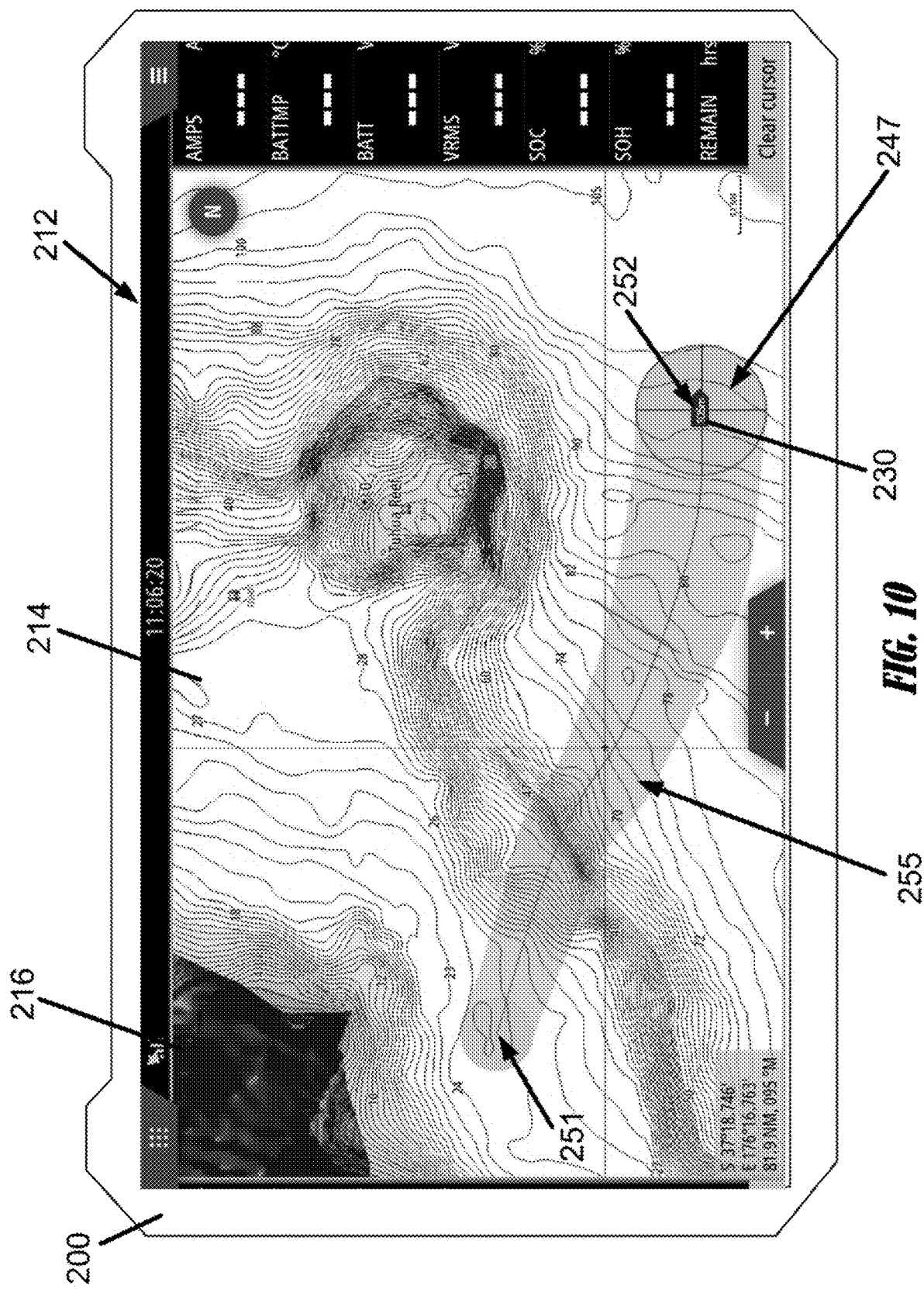
Figure 11:
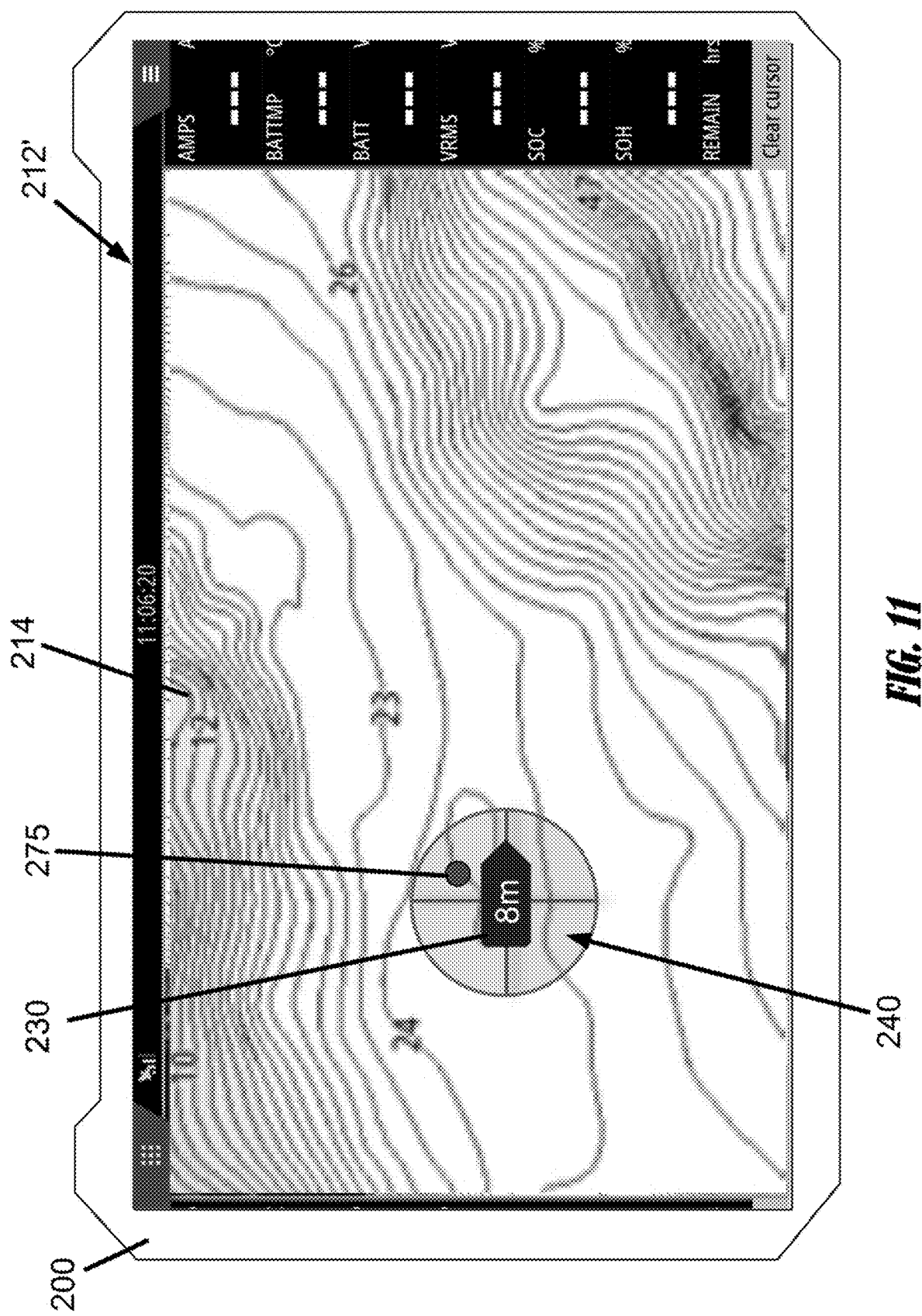
Figure 12:
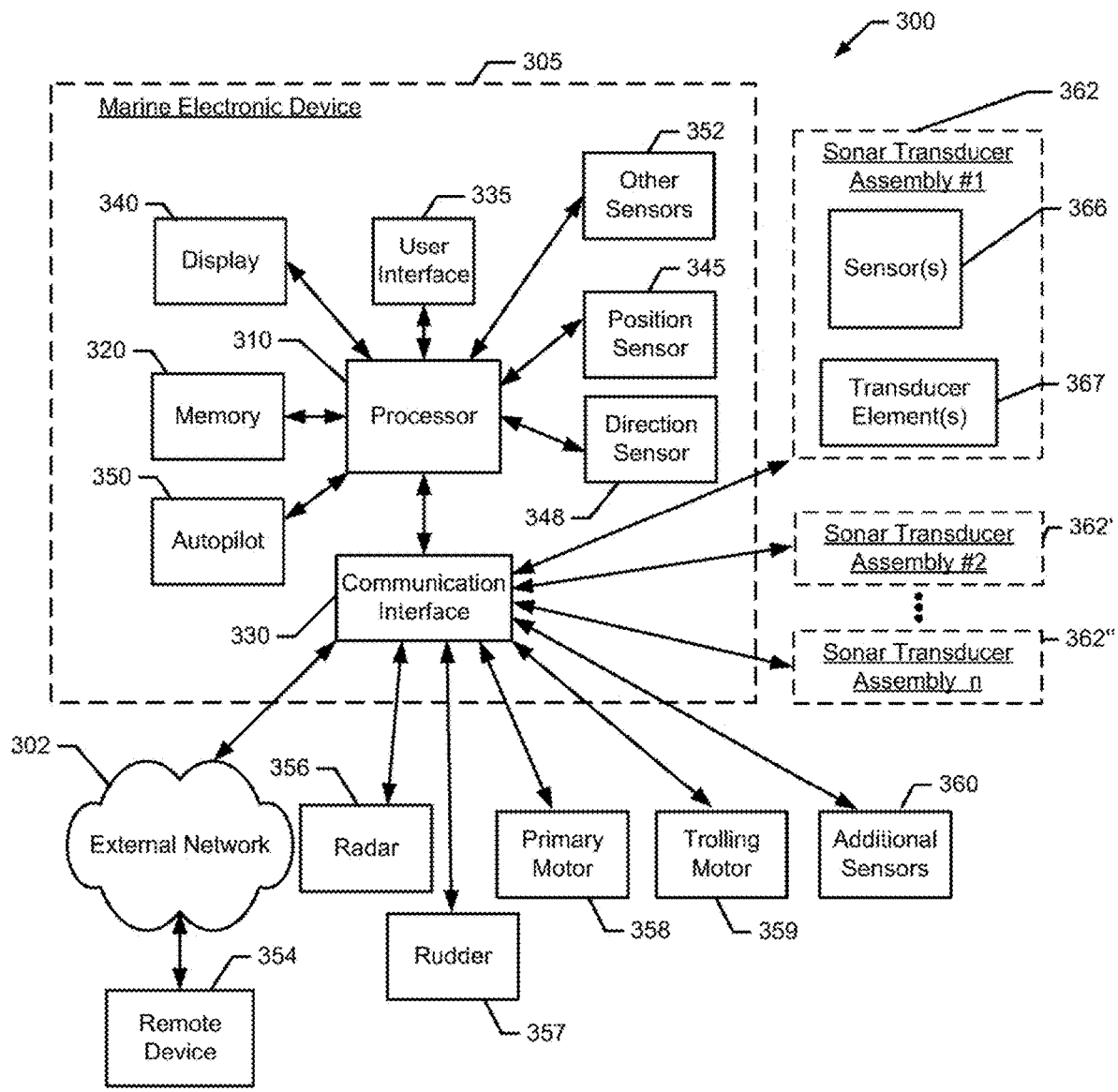
Figure 13:
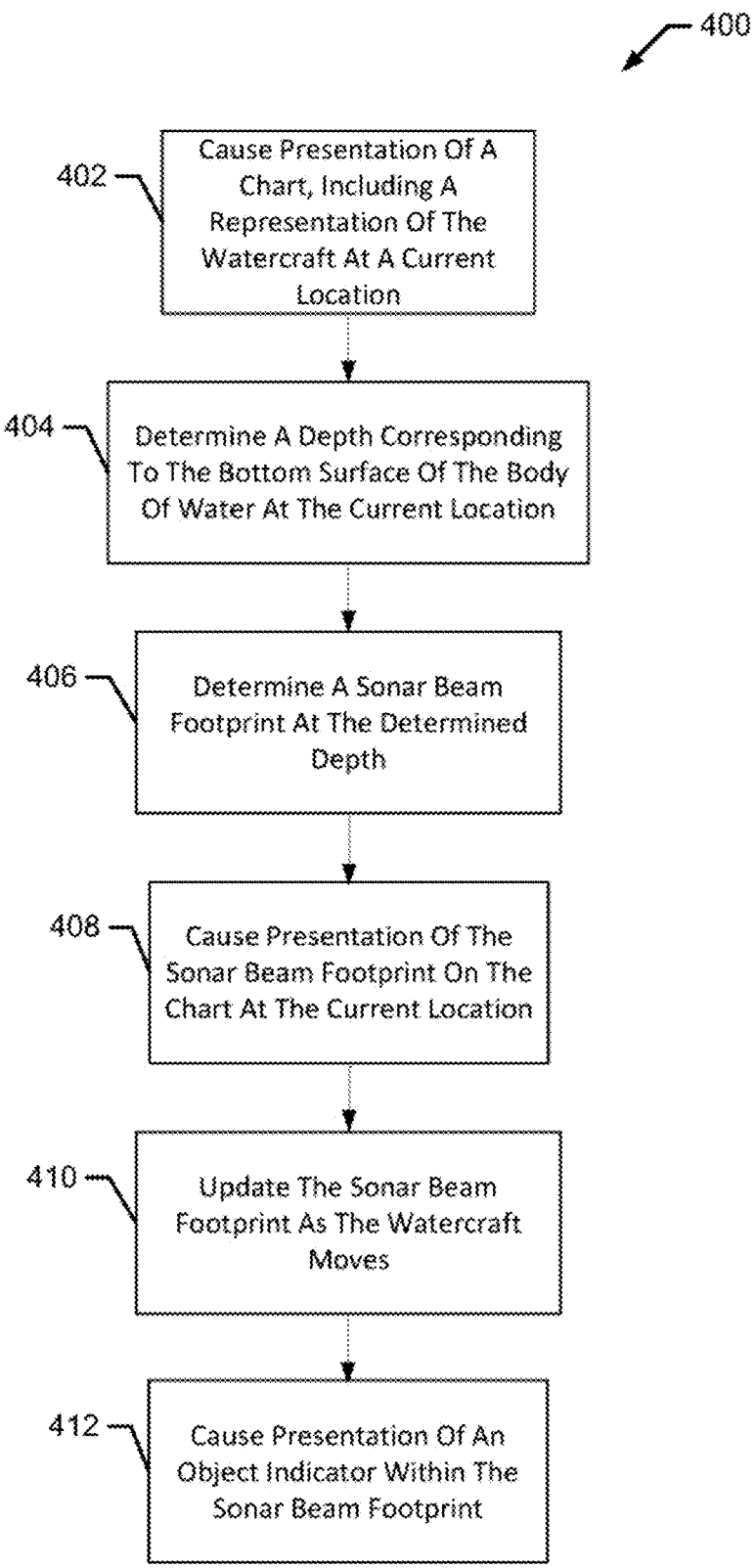

Having thus described the invention in general terms, reference will now be made to the accompanying drawings, which are not necessarily drawn to scale, and wherein:

FIG. 1 illustrates an example watercraft including various marine devices, in accordance with some embodiments discussed herein;

FIG. 2 illustrates an example display presenting a sonar image, in accordance with some embodiments discussed herein;

FIG. 3A illustrates an example sonar beam extending from a transducer, wherein the sonar beam footprint on the bottom surface of the body of water is illustrated based on a first depth to the bottom surface, in accordance with some embodiments discussed herein;

FIG. 3B illustrates the example sonar beam from FIG. 3A extending from the transducer, wherein the sonar beam footprint on the bottom surface of the body of water is illustrated based on a second, greater depth to the bottom surface, in accordance with some embodiments discussed herein;

FIG. 4 illustrates an example display presenting a chart with an example sonar beam footprint overlay at the corresponding current location of the watercraft, in accordance with some embodiments discussed herein;

FIG. 5 illustrates the example display presenting the chart with another example sonar beam footprint overlay at the corresponding current location of the watercraft, in accordance with some embodiments discussed herein;

FIG. 6 illustrates the example display presenting the chart with two example sonar beam footprint overlays at the corresponding current location of the watercraft, in accordance with some embodiments discussed herein;

FIG. 7 illustrates the example display presenting the chart with the example sonar beam footprint overlay shown in FIG. 4, wherein the zoom level of the chart has been increased from the zoom level shown in FIG. 4, in accordance with some embodiments discussed herein;

FIG. 8 illustrates the example display presenting the chart with a second example sonar beam footprint overlay at a second location of the watercraft, wherein the depth at the second location is different than the depth at the location of the watercraft shown in FIG. 4, in accordance with some embodiments discussed herein;

FIG. 9 illustrates the example display presenting the chart with a third example sonar beam footprint overlay at a third location of the watercraft, wherein the depth at the third location is different than the depth at the second location of the watercraft shown in FIG. 8, in accordance with some embodiments discussed herein;

FIG. 10 illustrates the example display presenting the chart with an example trail of sonar beam footprints at past positions of the watercraft, in accordance with some embodiments discussed herein;

FIG. 11 illustrates the example display presenting the chart with an example sonar beam footprint overlay at the corresponding current location of the watercraft, wherein an indicator of an object within the sonar return data is presented within the sonar beam footprint, in accordance with some embodiments discussed herein;

FIG. 12 illustrates a block diagram of an example system with various electronic devices, marine devices, and secondary devices shown, in accordance with some embodiments discussed herein; and FIG. 13 illustrates a flowchart of an example method of presenting a sonar beam footprint over a chart, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals refer to like elements throughout.

FIG. 1 illustrates an example watercraft 100 including various marine devices, in accordance with some embodiments discussed herein. As depicted in FIG. 1, the watercraft 100 (e.g., a vessel) is configured to traverse a marine environment, e.g. body of water 101, and may use one or more sonar transducer assemblies 102a, 102b, and 102c disposed on and/or proximate to the watercraft. Notably, example watercraft contemplated herein may be surface watercraft, submersible watercraft, or any other implementation known to those skilled in the art. The transducer assemblies 102a, 102b, and 102c may each include one or more transducer elements configured to transmit sound waves into a body of water, receive sonar returns from the body of water, and convert the sonar returns into sonar return data. Various types of sonar transducers may be provided—for example, a linear downscan sonar transducer, a conical downscan sonar transducer, a sonar transducer array, an assembly with multiple transducer arrays, or a sidescan sonar transducer may be used.

Depending on the configuration, the watercraft 100 may include a primary motor 105, which may be a main propulsion motor such as an outboard or inboard motor. Additionally, the watercraft 100 may include a trolling motor 108 configured to propel the watercraft 100 or maintain a position. The one or more transducer assemblies (e.g., 102a, 102b, and/or 102c) may be mounted in various positions and to various portions of the watercraft 100 and/or equipment associated with the watercraft 100. For example, the transducer assembly may be mounted to the transom 106 of the watercraft 100, such as depicted by transducer assembly 102a. The transducer assembly may be mounted to the bottom or side of the hull 104 of the watercraft 100, such as depicted by transducer assembly 102b. The transducer assembly may be mounted to the trolling motor 108, such as depicted by transducer assembly 102c.

The watercraft 100 may also include one or more marine electronic devices 160, such as may be utilized by a user to interact with, view, or otherwise control various functionality regarding the watercraft, including, for example, nautical charts and various sonar systems described herein. In the illustrated embodiment, the marine electronic device 160 is positioned proximate the helm (e.g., steering wheel) of the watercraft 100—although other places on the watercraft 100 are contemplated. Likewise, additionally or alternatively, a remote device (such as a user's mobile device) may include functionality of a marine electronic device.

The watercraft 100 may also comprise other components within the one or more marine electronic devices 160 or at the helm. In FIG. 1, the watercraft 100 comprises a radar 116, which is mounted at an elevated position (although other positions relative to the watercraft are also contemplated). The watercraft 100 also comprises an AIS transceiver 118, a direction sensor 120, and a camera 122, and these components are each positioned at or near the helm (although other positions relative to the watercraft are also contemplated). Additionally, the watercraft 100 comprises a rudder 110 at the stern of the watercraft 100, and the rudder 110 may be positioned on the watercraft 100 so that the rudder 110 will rest in the body of water 101. In other embodiments, these components may be integrated into the one or more electronic devices 160 or other devices. Another example device on the watercraft 100 includes a temperature sensor 112 that may be positioned so that it will rest within or outside of the body of water 101. Other example devices include a wind sensor, one or more speakers, and various vessel devices/features (e.g., doors, bilge pump, fuel tank, etc.), among other things. Additionally, one or more sensors may be associated with marine devices; for example, a sensor may be provided to detect the position of the primary motor 105, the trolling motor 108, or the rudder 110.

FIG. 2 illustrates an example display and various views that may be presented on the example display 200, such as on a marine electronic device (e.g., 160 in FIG. 1 or 305 in FIG. 12). The example display 200 is illustrating a sonar image 202 corresponding to sonar return data received with a conical downscan transducer (although other sonar image types that utilize similar or different configurations and types of sonar transducers are contemplated). In some embodiments, other types of data may be presented as well, including but not limited to other views of sonar data, radar data, and navigational maps.

Various objects may be represented within the sonar image 202, and these objects may include fish or other underwater animals, elevations or depressions in the bottom surface of the water, underbrush, other structure such as a pipeline or debris, etc. In FIG. 2, a representation of a fish 206 is illustrated as a fish arch, as is known to one of ordinary skill in the art. Additionally, the bottom surface of the body of water is shown at 208 at approximately 16 feet.

The example sonar image 202 is a build-up of slices of sonar return data moving from right to left (with the oldest slices at the far left). For example, a conical sonar transducer aimed downwardly from the watercraft would emit a sonar beam downwardly into the underwater environment. The sonar returns (which bounced off various objects and returned) would be received by the transducer and be correlated with a time of travel—giving a 1-dimensional time indication which corresponds to the depth that the sonar return traveled. That sonar return data forms a vertical slice indicating where the sonar returns were in terms of depth. The sonar image 202 in FIG. 2 indicates that the bottom surface 208 was around 16 feet.

Notably, in some embodiments, the sonar returns may also indicate a strength of return, which may correlate to a firmness of the object for which the return bounced off of. In some embodiments, the strength of return (and/or multiple nearby returns) can be used to determine the depth of the bottom surface of the body of water. For example, the bottom surface 208 may be assumed to correspond to one or more sonar returns with a certain strength value (e.g., the bottom surface 208 is distinctly illustrated in the sonar image 202).

Notably, the sonar image 202 is provided as merely an example, as other types of sonar images are contemplated, such as live 2-dimensional sonar images, sidescan sonar images, linear downscan sonar images, 3-dimensional sonar images, among others.

Different sonar transducers and arrays/assemblies emit sonar beams of different shapes. For example, the sound emitting from the sonar transducer within the main lobe that is within the + and −3 dB angle of sound intensity emitted forms a beam pattern (e.g., a sonar beam shape) that is dependent on various characteristics of the transducer (e.g., the shape of the emitting face, the frequency of operation, etc.).

In this regard, the sonar transducer may be formed of one or more active elements (e.g., piezoelectric crystals). Wires are soldered to coatings on the active element and can be attached to a cable which transfers the electrical energy from a transmitter to the active element. As an example, when the frequency of the electrical signal is the same as the mechanical resonant frequency of the active element, the active element moves, creating sound waves at that frequency. The shape of the active element determines both its resonant frequency and shape of the sonar beam. Further, padding can be used to prevent sonar emissions from certain faces of the active element (e.g., the top and sides) leaving exposed only the emitting faces for which the sonar beam is desired.

Frequencies used by sonar devices vary, and some sonar transducers may produce sonar beams at multiple different frequencies. As an example, in some transducer assemblies, a linear transducer (which emits sonar beams from a rectangular-shaped face) may be configured to operate at two different frequencies, either 455 kHz or 800 kHz. Notably, the higher the frequency, the more focused the sonar beam (and sound energy) emitting from the sonar transducer is, meaning that the sonar beam width from the emitting face is smaller with the higher frequency. However, less of the water column volume closer to the watercraft is covered by the sonar beam. The most common sonar transducers utilize a frequency range from 50 KHz to over 900 KHz depending on application. Some sonar systems vary the frequency within each sonar pulse using "chirp" technology.

FIG. 3A illustrates an example sonar beam 221 emitted from a conical transducer (for ease of illustration and explanation, while the sonar beam is shown in perspective view, the conical transducer is shown in cross-sectional view, thereby having a rectangular cross-section). The emitting face 220a of the transducer 220 is circular in shape and produces a cone-shaped sonar beam 221 with a beam width of $\theta_1$. A projection (e.g., sonar beam footprint 222) of the sonar beam 221 on the bottom surface 228 of the body of water is illustrated. Notably, at a depth of Depth$_1$, the sonar beam 221 produces a sonar beam footprint 222 with a diameter $D_1$. That sonar beam footprint 222 provides a general indication of what is covered by the sonar beam in the underwater environment.

In the depicted embodiment, a flat projection of the sonar beam footprint is illustrated and assumes a flat bottom surface. In some embodiments, different shaping may be utilized (e.g., assumed and/or determined) to determine the projection of the sonar beam at the determined depth. For example, where the shaping of the bottom surface is known or estimated, a corresponding projection of the sonar beam onto that bottom surface (according to its shaping) may be determined. In this regard, the projection may have peaks and valleys that correspond to the shaping of the bottom surface around the determined depth (e.g., if the determined depth is on a rightward sloped bottom surface, the projection may indicate a corresponding shaping (e.g., the left side would not extend as far to the left as the right side extends to the right—accounting for the further distance of travel of the sonar beam on the right side to reach the depth of the actual bottom surface). Further, in some embodiments, shading or different coloring (or other indicators) may be utilized in the imaging of the projection to indicate the sloped bottom surface/different shaping of the projection.

Notably, however, the depth to the bottom surface can affect the size of the sonar beam footprint even though the shape of the sonar beam does not change. In this regard, the same sonar beam will cover a greater surface area of the bottom surface when the bottom surface is further away from the transducer (e.g., the bottom surface is at a greater depth). For example, with reference to FIG. 3B, with the transducer 220 at the same initial height (such as attached to a watercraft floating on the water surface), the same shaped sonar beam 221 traveling a greater depth Depth$_2$ creates a sonar beam footprint 223 on the bottom surface 229 that has a greater diameter $D_2$ than that of the sonar beam footprint 222 when the sonar beam 221 only traveled a depth Depth$_1$.

The above described example of creating a sonar beam footprint with greater coverage for a conical transducer at greater depths also applies to other shaped transducers that are pointed downwardly (whether directly down or at least partially down (e.g., and forward, backward, or to the side)). For example, a linear transducer emits sonar beams from a rectangular emitting face—thereby forming a fan-shaped sonar beam (relatively wide in one direction and relatively narrow in a perpendicular direction). However, like the conical transducer, a corresponding sonar beam footprint on the bottom surface will increase in size as the depth of the bottom surface increases. This concept is also true for other shapes of transducer elements.

Whether a novice or an expert, it would be beneficial to be able to quickly and easily visually appreciate the real world sonar coverage of a sonar transducer of the watercraft at a specific location. Indeed, even for experts, it can be difficult to determine the real world sonar coverage of a sonar transducer of a watercraft. As detailed above, there are many factors that dictate a sonar beam shape and, further, how the sonar beam shape translates into sonar coverage at the current location of the sonar transducer.

Some embodiments of the present invention aim to provide useful information that will aid the user in determining and understanding the sonar coverage of the underwater environment. Some example embodiments take into account various factors/characteristics regarding a sonar transducer and provide a visual indication of the sonar beam coverage offered by the sonar transducer.

In some embodiments, the system determines the sonar beam footprint that would project onto the bottom surface of the underwater environment at the current location and presents a visual representation of that sonar beam footprint on a chart. FIG. 4 illustrates an example display 200 (e.g., the display 340 of the marine electronic device 305 shown in FIG. 12) presenting a chart 212. The chart 212 includes a representation of the watercraft 230 at a current location within the chart (e.g., such as may be determined based on position data). As illustrated, the representation of the watercraft 230 may have a relative size, such as may correspond to the zoom level of the chart 212, and a direction that indicates in which direction the watercraft 230 is pointing (e.g., such as may be based on orientation data or recent/current position data). Additionally, the depth (e.g., 8 meters) at the current location may be displayed on an icon corresponding to the representation of the watercraft 230. The body of water may be illustrated as 214, such as in comparison to land, which is illustrated as 216. The chart 212 may also include depth readings, such as may be pre-stored and/or may be updated based on various incoming data (e.g., tidal data, sonar data, satellite data, etc.).

As indicated herein, various factors may affect the sonar coverage of a sonar transducer at a specific location. Some example, factors include, the transducer shape (or shape of the emitting face(s) of the transducer, the number of transducers, the configuration of how the transducer(s) operate, the direction the transducer(s) are facing relative to the watercraft, the relative location of the transducer(s) on the watercraft, the depth of the bottom surface at the current location, the frequency of operation, etc. In some embodiments, the system may be configured to determine and account for at least some of the various factors to determine and provide an indication to a user of the sonar coverage at the specific location.

In some embodiments, the system may be configured to determine and cause presentation of a sonar beam footprint on a chart, such as to indicate the relative position and size of coverage of the sonar transducer. As indicated herein, the sonar beam footprint may correspond to a flat projection of the beam shape of a sonar transducer onto the bottom surface of the underwater environment at a location. The system may be configured to cause such a presentation in response to a user input indicating a desire to present such information.

Returning to FIG. 4, the system may be configured to cause presentation of the chart 212 on the display 200, along with a representation of the watercraft 230 at a current location within the chart 212. The chart 212 may be stored in memory and/or gathered via an external or internal network. The position and/or orientation of the watercraft 230 may be determined via position/orientation data, such as from a global positioning system (GPS) and/or other source (s). Accordingly, a representation of the watercraft 230 may be presented on the chart 212—such as illustrated in FIG. 4.

The system may also be configured to determine one or more sonar transducers associated with the watercraft (e.g., mounted thereto, mounted to a trolling motor of the watercraft, utilized with a sonar pole, utilized with a towfish, etc.). For example, the watercraft may include a "traditional" downward facing transducer (e.g., a conical transducer, which may include a circular-shaped emitting face). The system may be configured to determine the sonar beam shape configured to emit from the one or more sonar transducers. For example, the system may be configured to determine the beam shape emitted from the conical downward facing transducer mounted to the watercraft. As indicated above, various factors may be utilized to determine the beam shape (e.g., transducer size and/or shape, frequency of operation, direction, etc.). In some embodiments, the beam shape may be predetermined and stored in memory for the system to determine it therefrom. In some embodiments, the relative position of the mounting of the transducer may also be accounted for. Alternatively, in some embodiments, a central mounting on the watercraft may be assumed.

As indicated herein, the depth of the bottom surface of the body of water at the current location may change and the resulting sonar coverage of the underwater environment at the current location may vary in comparison to the sonar coverage at other locations (e.g., the other locations may have different depths of their respective bottom surface). Accordingly, in some embodiments, the system may be configured to determine the depth of the bottom surface of the body of water at the current location. In some embodiments, the depth may be determined based on a pre-determined depth at a location (e.g., a stored depth within the chart, a stored depth in memory, a depth gathered from an internal or external network, etc.). In some embodiments, the depth may be determined based on sonar data, such as described with respect to FIG. 2 above. The sonar data may be from one or more sonar transducers of the watercraft. In some embodiments, the determined depth may be generated from a combination of sources (e.g., the depth of the bottom surface may be determined from the sonar data and checked against a predetermined depth at the location for accuracy). Accordingly, adjustments may be made if appropriate.

In some embodiments, the system may be configured to determine a sonar beam footprint corresponding to a flat projection of the beam shape of the sonar transducer on the bottom surface at the determined depth. For example, referring to FIG. 3A, the system may be configured to determine the sonar beam footprint 222. In some embodiments, determination of the sonar beam footprint at the current location may be based on the determined beam shape and the determined depth of the bottom surface at the current location. In some embodiments, the beam shape and/or the sonar beam footprint may be determined based on additional factors, such as described herein (e.g., frequency of operation, direction relative to the watercraft, etc.). Referring back to FIG. 4, the system may be configured to determine that the sonar beam footprint has a shape with certain dimensions, such as a width $W_{F1}$ and a length $L_{F1}$ (although any dimensional characteristics may be determined and/or used to describe the determined sonar beam footprint). For example, diameter (or radius) could be determined for the sonar beam footprint.

With the sonar beam footprint determined, in some embodiments, the system may be configured to provide a visual indication of the sonar beam footprint to the user. For example, the system may cause presentation of the sonar beam footprint on the display, such as via an overlay on the chart at the current location. The presentation of the sonar beam footprint may be relative to the representation of the watercraft so as to visually indicate sonar beam coverage relative to the watercraft and within the underwater environment leading to the bottom surface. For example, a sonar beam footprint 240 in the shape of a circle with the width $W_{F1}$ and length $L_{F1}$ is presented with the representation of the watercraft 230 at the current location. Such a sonar beam footprint 240 corresponds with a flat projection of a sonar beam from a downward facing conical transducer onto the bottom surface at the determined depth for that current location. Accordingly, a user can quickly and easily determine the sonar coverage of the conical transducer at that current location. This understanding can be useful for various activities, such as fishing, bottom-mapping, among other things. For example, the user can quickly determine where various objects presented within the sonar image (e.g., the sonar image 202 in FIG. 2) are in the real-world (such as via the visual indication on the chart of the sonar beam footprint).

While the sonar beam footprint 240 is shown in highlighted form in FIG. 4, various embodiments contemplate other visualization options for the presentation of the sonar beam footprint. For example, the sonar beam footprint may be presented in one or more colors, one or more patterns, and/or other distinguishing visualization options. Likewise, different levels of transparency may be utilized.

In some embodiments, additional and/or different sonar transducer(s) may be associated with the watercraft (e.g., mounted thereto, mounted to a trolling motor of the watercraft, utilized with a sonar pole, utilized with a towfish, etc.). Accordingly, the different sonar transducer may produce a different sonar beam shape, e.g., depending on the different characteristics of the sonar transducer. In this regard, the system may determine and present a different sonar beam footprint corresponding to the specific characteristics and factors for the different sonar transducer. For example, FIG. 5 shows the display 200 presenting a sonar beam footprint 241 for a linear downward facing (e.g., downscan) transducer. In this regard, the sonar beam footprint 241 is defined by a width $W_{F2}$ that is relatively wide and a length $L_{F2}$ that is relatively narrow—forming a rectangular shape (e.g., corresponding to a flat projection of a fan-shaped sonar beam onto a bottom surface at the current location of the watercraft).

In some embodiments, the user may be able to select between the available transducers to determine which sonar beam footprint to present. In some embodiments, the system may have the sonar beam footprint linked to displayed sonar images that are currently presented on the display (e.g., in split-screen format) or another associated display. For example, when the user has traditional sonar imagery displayed, the system may determine and present the sonar beam footprint from the conical transducer (e.g., shown in FIG. 4), whereas when linear downscan sonar imagery is display, the system may determine and present the sonar beam footprint from the linear transducer (e.g., shown in FIG. 5). In some embodiments, both sonar beam footprints may be presented. In some embodiments, the system may swap between which sonar beam footprints are presented, removing or ceasing presentation of one when the other is selected or determined.

FIG. 6 illustrates an example where multiple different sonar beam footprints are presented on the chart 212 simultaneously. In the illustrated example, the sonar beam footprint 241 corresponding to the linear downscan transducer is presented. However, another sonar beam footprint 242 corresponding to a forward facing transducer (or transducer assembly) is also presented. For example, the sonar beam footprint 242 may correspond to a sonar beam (or a plurality of sonar beams) that result in formation of a 2-dimensional live sonar image. Such a sonar beam shape may extend in the forward direction from the watercraft and may, for example, have a distance ahead of the watercraft that corresponds to sonar coverage. Such factors (e.g., direction and distance), along with others, may be considered when determining the sonar beam footprint. Notably, in some example embodiments, the sonar beam footprint for various sonar transducers may not be directly related to the depth of the bottom surface relative to the watercraft. In this regard, for example, the sonar beam footprint 242 may be bounded on the chart by the effective distance of the 2-dimensional live sonar image instead of the depth of a bottom surface of the body of water.

FIG. 6 also illustrates that in some embodiments, the relative position of the sonar transducer on the watercraft may be accounted for when forming and/or presenting the sonar beam footprint. In this regard, the forward facing sonar transducer(s) that is associated with the sonar beam footprint 242 may be positioned near the front of the watercraft (e.g., mounted to the front of the watercraft, mounted to a trolling motor positioned on the front of the watercraft, etc.). Likewise, the linear downscan transducer (associated with the sonar beam footprint 241) may be positioned near the center of the watercraft.

In some embodiments, the system may account for the zoom level of the chart when determining and/or presenting the sonar beam footprint. For example, with reference to FIG. 7, the chart 212' has been zoomed in on. Accordingly, the relative size of the representation of the watercraft 230 has increased—such as with respect to that shown in FIG. 4. Additionally, the system has adjusted the relative size of the sonar beam footprint 240 to align with the increased zoom level. In this regard, the sonar beam footprint 240 has a corresponding increased width $W_{F1'}$ and length $L_{F1'}$.

As the watercraft moves, the system may be configured to update the sonar beam footprint. For example, FIG. 8 illustrates that the watercraft has moved to a second location. Notably, the depth of the bottom surface at the second location has increased (such as with respect to the depth of the bottom surface when the watercraft was at the first location in FIG. 4). In the illustrated embodiment, when comparing it to FIG. 4, the sonar beam footprint 240 from FIG. 4 has been removed and the new sonar beam footprint 246 is now presented. Further, the size of the sonar beam footprint 246 (as indicated by a width $W_{F3}$ and a length $L_{F3}$) is increased in comparison to the size of the sonar beam footprint 240 shown in FIG. 4—since the depth of the bottom surface at the second location is greater than at the first location.

FIG. 9 illustrates a third sonar beam footprint 247 corresponding to the watercraft having moved to a new, third location. Notably, the depth of the bottom surface at the third location is even greater than the depth of the bottom surface at the second location—thereby causing an even bigger sonar beam footprint 247 (as indicated by a width $W_{F4}$ and a length $L_{F4}$) to be presented.

In some embodiments, the system may be configured to present a trail of sonar beam footprints as the watercraft travels. In this regard, a user can easily visualize which parts of the body of water have been covered by the sonar transducer and which parts haven't been covered. Such an example embodiment is beneficial for sonar mapping of the body of water. In this regard, users may want to generate sonar imagery for the entire body of water (or a portion of the body of water) to help them, for example, determine where to fish (e.g., based on the location of beneficial underwater structure, cliffs, etc.). FIG. 10 illustrates an example sonar beam footprint trail 255. The first sonar beam footprint is shown at the starting location 251 and the current sonar beam footprint 247 is illustrated at the current location 252 (e.g., where the representation of the watercraft 230 is on the chart)—with a trail of the sonar beam footprints extending therebetween (each corresponding to the sonar beam footprint at the corresponding location along the trail). For example, as the watercraft travels into deeper water, the size of the sonar beam footprints increase.

In some embodiments, the system may be configured to determine a position of an object within sonar imagery and present an indication of the object in the relative position within the sonar beam footprint. In this regard, the system may be configured to provide a user with a real-world position of an object that is presented in the sonar imagery.

In some embodiments, the system may be configured to determine an object within sonar imagery. For example, a user may select the representation of the object within the sonar imagery (e.g., select the fish arch 206 in the sonar image 202 shown in FIG. 2—although other objects are contemplated, such as structure, fish schools, etc.). Additionally or alternatively, the system may select the object, such as based on various criteria.

Once determined, the system may be configured to determine the position of the object within the sonar beam footprint. In some embodiments, determining the position of the object within the sonar beam footprint may include determining the relative position in a horizontal plane (e.g., the plane corresponding to the chart view). In some embodiments, the corresponding depth of the object may also be determined and utilized. Such position determination may occur using various different data inputs. For example, the subject sonar transducer may enable such a determination (e.g., using a sonar transducer array and interferometry, beamforming, etc.). Additionally or alternatively, other sonar transducers or data sources may be utilized. In some embodiments, stored data may be used to determine a position of an object within the sonar beam footprint.

The system may then be configured to present an indicator within the sonar beam footprint corresponding to the object. For example, FIG. 11 includes an indicator 275 positioned within the sonar beam footprint 240. In such an example, if the indicator 275 corresponds to a fish, the user would know that the object was in the general forward and port side of the watercraft. While the illustrated embodiment provides a red dot as the indicator, other indicators are contemplated for presentation. For example, a fish icon, a representation of the sonar returns, or other image may be presented instead of or in addition to a dot.

In some embodiments, the system may be configured to track the object as additional sonar data is captured. In some such embodiments, the system may be configured to present the indicator in corresponding positions as the object moves (and/or the watercraft moves with respect to the object)—thereby "tracking" the object within the sonar beam footprint.

Example System Architecture

FIG. 12 illustrates a block diagram of an example system 300 according to various embodiments of the present invention described herein. The illustrated system 300 includes a marine electronic device 305. The system 300 may comprise numerous marine devices. As shown in FIG. 12, one or more sonar transducer assemblies 362 may be provided. A radar 356, a rudder 357, a primary motor 358, a trolling motor 359, and additional sensors/devices 360 may also be provided as marine devices, but other marine devices may be provided as well. One or more marine devices may be implemented on the marine electronic device 305. For example, a position sensor 345, a direction sensor 348, an autopilot 350, and other sensors 352 may be provided within the marine electronic device 305. These marine devices can be integrated within the marine electronic device 305, integrated on a watercraft at another location and connected to the marine electronic device 305, and/or the marine devices may be implemented at a remote device 354 in some embodiments. The system 300 may include any number of different systems, modules, or components; each of which may comprise any device or means embodied in either hardware, software, or a combination of hardware and software configured to perform one or more corresponding functions described herein.

The marine electronic device 305 may include at least one processor 310, a memory 320, a communication interface 330, a user interface 335, a display 340, autopilot 350, and one or more sensors (e.g. position sensor 345, direction sensor 348, other sensors 352). One or more of the components of the marine electronic device 305 may be located within a housing or could be separated into multiple different housings (e.g., be remotely located).

The processor(s) 310 may be any means configured to execute various programmed operations or instructions stored in a memory device (e.g., memory 320) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the at least one processor 310 as described herein. For example, the at least one processor 310 may be configured to analyze sonar return data for various features/functions described herein (e.g., generate a sonar image, determine an object and/or object position, etc.).

In some embodiments, the at least one processor 310 may be further configured to implement signal processing. In some embodiments, the at least one processor 310 may be configured to perform enhancement features to improve the display characteristics of data or images, collect or process additional data, such as time, temperature, GPS information, waypoint designations, or others, or may filter extraneous data to better analyze the collected data. The at least one processor 310 may further implement notices and alarms, such as those determined or adjusted by a user, to reflect proximity of other objects (e.g., represented in sonar data), to reflect proximity of other vehicles (e.g. watercraft), approaching storms, etc.

In an example embodiment, the memory 320 may include one or more non-transitory storage or memory devices such as, for example, volatile and/or non-volatile memory that may be either fixed or removable. The memory 320 may be configured to store instructions, computer program code, sonar data, and additional data such as radar data, chart data, location/position data in a non-transitory computer readable medium for use, such as by the at least one processor 310 for enabling the marine electronic device 305 to carry out various functions in accordance with example embodiments of the present invention. For example, the memory 320 could be configured to buffer input data for processing by the at least one processor 310. Additionally or alternatively, the memory 320 could be configured to store instructions for execution by the at least one processor 310.

The communication interface 330 may be configured to enable communication to external systems (e.g. an external network 302). In this manner, the marine electronic device 305 may retrieve stored data from a remote device 354 via the external network 302 in addition to or as an alternative to the onboard memory 320. Additionally or alternatively, the marine electronic device 305 may transmit or receive data, such as sonar signal data, sonar return data, sonar image data, or the like to or from a sonar transducer assembly 362. In some embodiments, the marine electronic device 305 may also be configured to communicate with other devices or systems (such as through the external network 302 or through other communication networks, such as described herein). For example, the marine electronic device 305 may communicate with a propulsion system of the watercraft 100 (e.g., for autopilot control); a remote device (e.g., a user's mobile device, a handheld remote, etc.); or another system. Using the external network 302, the marine electronic device may communicate with and send and receive data with external sources such as a cloud, server, etc. The marine electronic device may send and receive various types of data. For example, the system may receive weather data, data from other fish locator applications, alert data, among others. However, this data is not required to be communicated using external network 302, and the data may instead be communicated using other approaches, such as through a physical or wireless connection via the communications interface 330.

The communications interface 330 of the marine electronic device 305 may also include one or more communications modules configured to communicate with one another in any of a number of different manners including, for example, via a network. In this regard, the communications interface 330 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or sonar transducer assemblies) may be included in the system 300.

The position sensor 345 may be configured to determine the current position and/or location of the marine electronic device 305 (and/or the watercraft 100). For example, the position sensor 345 may comprise a GPS, bottom contour, inertial navigation system, such as machined electromagnetic sensor (MEMS), a ring laser gyroscope, or other location detection system. Alternatively or in addition to determining the location of the marine electronic device 305 or the watercraft 100, the position sensor 345 may also be configured to determine the position and/or orientation of an object outside of the watercraft 100.

The display 340 (e.g. one or more screens) may be configured to present images and may include or otherwise be in communication with a user interface 335 configured to receive input from a user. The display 340 may be, for example, a conventional LCD (liquid crystal display), a touch screen display, mobile device, or any other suitable display known in the art upon which images may be displayed.

In some embodiments, the display 340 may present one or more sets of data (or images generated from the one or more sets of data). Such data includes chart data, radar data, sonar data, weather data, location data, position data, orientation data, sonar data, or any other type of information relevant to the watercraft. Sonar data may be received from one or more sonar transducer assemblies 362 or from sonar devices positioned at other locations, such as remote from the watercraft. Additional data may be received from marine devices such as a radar 356, a primary motor 358 or an associated sensor, a trolling motor 359 or an associated sensor, an autopilot, a rudder 357 or an associated sensor, a position sensor 345, a direction sensor 348, other sensors 352, a remote device 354, onboard memory 320 (e.g., stored chart data, historical data, etc.), or other devices.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 335 may include, for example, a keyboard, keypad, function keys, mouse, scrolling device, input/output ports, touch screen, or any other mechanism by which a user may interface with the system.

Although the display 340 of FIG. 12 is shown as being directly connected to the at least one processor 310 and within the marine electronic device 305, the display 340 could alternatively be remote from the at least one processor 310 and/or marine electronic device 305. Likewise, in some embodiments, the position sensor 345 and/or user interface 335 could be remote from the marine electronic device 305.

The marine electronic device 305 may include one or more other sensors/devices 352, such as configured to measure or sense various other conditions. The other sensors/devices 352 may include, for example, an air temperature sensor, a water temperature sensor, a current sensor, a light sensor, a wind sensor, a speed sensor, or the like.

The sonar transducer assemblies 362 illustrated in FIG. 12 may include one or more sonar transducer elements 367, such as may be arranged to operate alone or in one or more transducer arrays. In some embodiments, additional separate sonar transducer elements (arranged to operate alone, in an array, or otherwise) may be included. As indicated herein, the sonar transducer assemblies 362 may also include a sonar signal processor or other processor (although not shown) configured to perform various sonar processing. In some embodiments, the processor (e.g., at least one processor 310 in the marine electronic device 305, a controller (or processor portion) in the sonar transducer assemblies 362, or a remote controller—or combinations thereof) may be configured to filter sonar return data and/or selectively control transducer element(s) 367. For example, various processing devices (e.g., a multiplexer, a spectrum analyzer, A-to-D converter, etc.) may be utilized in controlling or filtering sonar return data and/or transmission of sonar signals from the transducer element(s) 367.

The sonar transducer assemblies 362 may also include one or more other systems, such as various sensor(s) 366. For example, the sonar transducer assembly 362 may include an orientation sensor, such as gyroscope or other orientation sensor (e.g., accelerometer, MEMS, etc.) that can be configured to determine the relative orientation of the sonar transducer assembly 362 and/or the one or more sonar transducer element(s) 367—such as with respect to a forward direction of the watercraft. In some embodiments, additionally or alternatively, other types of sensor(s) are contemplated, such as, for example, a water temperature sensor, a current sensor, a light sensor, a wind sensor, a speed sensor, or the like.

The components presented in FIG. 12 may be rearranged to alter the connections between components. For example, in some embodiments, a marine device outside of the marine electronic device 305, such as the radar 356, may be directly connected to the at least one processor 310 rather than being connected to the communication interface 330. Additionally, sensors and devices implemented within the marine electronic device 305 may be directly connected to the communications interface in some embodiments rather than being directly connected to the at least one processor 310.

Example Flowchart(s) and Operations

Some embodiments of the present invention provide methods, apparatus, and computer program products related to the presentation of information according to various embodiments described herein. Various examples of the operations performed in accordance with embodiments of the present invention will now be provided with reference to FIG. 13. FIG. 13 presents a flowchart with example method(s) of presenting a sonar beam footprint over a chart according to various embodiments described herein. These methods may be performed by a wide variety of components, including, but not limited to, one or more processors, one or more microprocessors, and one or more controllers. In some embodiments, a marine electronic device 305 (FIG. 12) may comprise one or more processors that perform the functions shown in FIG. 13. Further, these methods may be provided on a piece of software which runs on a central server that is at a remote location away from the watercraft, and the remote server may communicate with a processor or a similar component on the watercraft. Additionally, the methods could be integrated into a software update that may be installed onto existing hardware, or the methods may be integrated into the initial software or hardware provided in a radar unit, watercraft, server, etc.

FIG. 13 is a flowchart of an example method 400 for presenting a sonar beam footprint over a chart, in accordance with some embodiments discussed herein. The operations illustrated in and described with respect to FIG. 13 may, for example, be performed by, with the assistance of, and/or under the control of one or more of the processor 310, memory 320, communication interface 330, user interface 335, position sensor 345, direction sensor 348, other sensor 352, autopilot 350, transducer assembly 362, 362', 362", display 340, radar 356, rudder 357, primary motor 358, trolling motor 359, additional sensors 360, and/or external network 302/remote device 354.

At operation 402, the method comprises causing presentation of a chart, including a representation of the watercraft at a current location within the chart. At operation 404, the method comprises determining a depth corresponding to the bottom surface of the body of water at the current location. At operation 406, the method comprises determining a sonar beam footprint at the determined depth. Then, at operation 408, the method comprises causing presentation of the sonar beam footprint on the chart at the current location.

In some embodiments, the method comprises, at operation 410, updating the sonar beam footprint as the watercraft moves. In some embodiments, at operation 412, the method comprises causing presentation of an object indicator within the sonar beam footprint (which may include determining the object and/or tracking the object).

FIG. 13 illustrates a flowchart of a system, method, and computer program product according to various example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 320 and executed by, for example, the processor 310. As will be appreciated, any such computer program product may be loaded onto a computer or other programmable apparatus (for example, a marine electronic device 305) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 305) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A system for presenting marine data, wherein the system comprises:
    at least one sonar transducer associated with a watercraft, wherein the at least one sonar transducer is configured to emit one or more sonar beams into an underwater environment of a body of water in a direction relative to the watercraft, wherein the one or more sonar beams are each emitted according to a beam shape;
    a display;
    one or more processors; and
    a memory including computer program code configured to, when executed, cause the one or more processors to:
        cause, on the display, presentation of a chart including at least a portion of the body of water;
        cause, on the display, presentation of a representation of the watercraft at a position in the chart corresponding to a current location of the watercraft;
        determine a depth corresponding to a bottom surface of the body of water at the current location of the watercraft;
        determine, based on the determined depth and the beam shape corresponding to the at least one sonar transducer, a sonar beam footprint with a size corresponding to a two-dimensional projection of the beam shape onto the bottom surface at the determined depth, wherein the size of the determined sonar beam footprint varies based on the determined depth at the current location;
        cause, on the display, presentation of the sonar beam footprint on the chart in an updating plan view and relative to the representation of the watercraft so as to visually indicate sonar beam coverage of the at least one sonar transducer relative to the watercraft and within the underwater environment, wherein the sonar beam footprint presented on the chart is different than generated sonar imagery and is an indication of the two-dimensional projection of the beam shape on the bottom surface at the determined depth;
        determine, based on sonar data from the one or more sonar beams and the sonar beam footprint, an indicator position within the sonar beam footprint that corresponds to an actual position of an object within the one or more sonar beams relative to the watercraft as the object moves within the one or more sonar beams by tracking the object as additional sonar data is captured by the at least one sonar transducer; and cause, on the display, presentation of an object indicator at the corresponding determined indicator positions within the sonar beam footprint so as to visually indicate a relative position of the object to the watercraft on the chart as the object moves within the one or more sonar beams, wherein the object indicator is different than the generated sonar imagery and corresponds to the object within the sonar data received by the at least one sonar transducer at the current location.

2. The system of claim 1, wherein the sonar beam footprint is a first sonar beam footprint and the current location is a first location, wherein the computer program code is further configured to, when executed, cause the one or more processors to:
   determine, in an instance in which the watercraft has moved to a second location, a second depth corresponding to the bottom surface of the body of water at the second location;
   determine, based on the determined second depth and the beam shape corresponding to the at least one sonar transducer, a second sonar beam footprint corresponding to a projection of the beam shape at the determined second depth; and
   cause, on the display, presentation of the second sonar beam footprint on the chart and relative to the representation of the watercraft.

3. The system of claim 2, wherein the computer program code is further configured to, when executed, cause the one or more processors to remove or cease presentation on the display of the first sonar beam footprint.

4. The system of claim 2, wherein the position in the chart is a first position in the chart, wherein the computer program code is further configured to, when executed, cause the one or more processors to cause, on the display, presentation of a trail of sonar beam footprint coverage from the first position in the chart to a second position in the chart corresponding to the second location of the watercraft.

5. The system of claim 1, wherein the sonar beam footprint is presented in one of highlight form or a pattern on the chart.

6. The system of claim 1, wherein the computer program code is further configured to, when executed, cause the one or more processors to determine the sonar beam footprint further based on an operating frequency of the at least one sonar transducer.

7. The system of claim 1, wherein the computer program code is further configured to, when executed, cause the one or more processors to:
   determine the sonar beam footprint further based the direction relative to the watercraft that the at least one sonar transducer is pointing; and
   cause, on the display, presentation of the sonar beam footprint on the chart and relative to the representation of the watercraft further based on the direction relative to the watercraft that the at least one sonar transducer is pointing.

8. The system of claim 1, wherein the at least one sonar transducer comprises a first sonar transducer and a second sonar transducer, wherein the first sonar transducer is configured to emit one or more first sonar beams extending from the watercraft and the second sonar transducer is configured to emit one or more second sonar beams extending from the watercraft, wherein each of the one or more first sonar beams are emitted according to a first beam shape, wherein each of the one or more second sonar beams are emitted according to a second beam shape, and wherein the computer program code is further configured to, when executed, cause the one or more processors to:
   determine one of the first sonar transducer or the second sonar transducer;
   determine a first sonar beam footprint in an instance in which the first sonar transducer is determined and a second sonar beam footprint in an instance in which the second sonar transducer is determined, wherein the first sonar beam footprint is different than the second sonar beam footprint; and
   cause, on the display, presentation of the first sonar beam footprint on the chart and relative to the representation of the watercraft in an instance in which the first sonar transducer is determined and cause, on the display, presentation of the second sonar beam footprint on the chart and relative to the representation of the watercraft in an instance in which the second sonar transducer is determined.

9. The system of claim 1, wherein the at least one sonar transducer comprises a first sonar transducer and a second sonar transducer, wherein the first sonar transducer is configured to emit one or more first sonar beams and the second sonar transducer is configured to emit one or more second sonar beams, wherein each of the one or more first sonar beams are emitted according to a first beam shape, wherein each of the one or more second sonar beams are emitted according to a second beam shape, and wherein the computer program code is further configured to, when executed, cause the one or more processors to:
   determine a first sonar beam footprint corresponding to the first sonar transducer and a second sonar beam footprint corresponding to the second sonar transducer, wherein the first sonar beam footprint is different than the second sonar beam footprint; and
   cause, on the display, presentation of the first sonar beam footprint on the chart and relative to the representation of the watercraft and presentation on the display of the second sonar beam footprint on the chart and relative to the representation of the watercraft simultaneously, wherein the presentation of the first sonar beam footprint and the presentation of the second sonar beam footprint extend from the representation of the watercraft respectively.

10. The system of claim 1, wherein the computer program code is further configured to, when executed, cause the one or more processors to determine the depth corresponding to the bottom surface of the body of water at the current location of the watercraft based on sonar data obtained using the at least one sonar transducer.

11. The system of claim 1, wherein the computer program code is further configured to, when executed, cause the one or more processors to determine the depth corresponding to the bottom surface of the body of water at the current location of the watercraft based on chart data.

12. The system of claim 1, wherein the computer program code is further configured to, when executed, cause the one or more processors to:
   determine a zoom level of the chart being presented on the display; and
   adjust a size of the sonar beam footprint based on the zoom level of the chart for presentation of the sonar beam footprint on the chart at the zoom level.

13. The system of claim 1, wherein the at least one sonar transducer comprises at least one of a linear downscan sonar transducer, a conical downscan sonar transducer, a sonar transducer array, or a sidescan sonar transducer.

14. A marine electronic device for presenting marine data, wherein the marine electronic device comprises:
   a display;
   one or more processors; and
   a memory including computer program code configured to, when executed, cause the one or more processors to:
      cause, on the display, presentation of a chart including at least a portion of a body of water;
      cause, on the display, presentation of a representation of a watercraft at a position in the chart corresponding to a current location of the watercraft;
      determine a depth corresponding to a bottom surface of the body of water at the current location of the watercraft;
      determine, based on the determined depth and a beam shape corresponding to at least one sonar transducer associated with the watercraft, a sonar beam footprint with a size corresponding to a two-dimensional projection of the beam shape onto the bottom surface at the determined depth, wherein the size of the determined sonar beam footprint varies based on the determined depth at the current location, wherein the at least one sonar transducer is configured to emit one or more sonar beams into an underwater environment of the body of water in a direction relative to the watercraft, wherein the one or more sonar beams are each emitted according to the beam shape;
      cause, on the display, presentation of the sonar beam footprint on the chart in an updating plan view and relative to the representation of the watercraft so as to visually indicate sonar beam coverage of the at least one sonar transducer relative to the watercraft and within the underwater environment, wherein the sonar beam footprint presented on the chart is different than generated sonar imagery and is an indication of the two-dimensional projection of the beam shape on the bottom surface at the determined depth;
      determine, based on sonar data from the one or more sonar beams and the sonar beam footprint, an indicator position within the sonar beam footprint that corresponds to an actual position of an object within the one or more sonar beams relative to the watercraft as the object moves within the one or more sonar beams by tracking the object as additional sonar data is captured by the at least one sonar transducer; and
      cause, on the display, presentation of an object indicator at the corresponding determined indicator positions within the sonar beam footprint so as to visually indicate a relative position of the object to the watercraft on the chart as the object moves within the one or more sonar beams, wherein the object indicator is different than the generated sonar imagery and corresponds to the object within the sonar data received by the at least one sonar transducer at the current location.

15. The marine electronic device of claim 14, wherein the sonar beam footprint is a first sonar beam footprint and the current location is a first location, wherein the computer program code is further configured to, when executed, cause the one or more processors to:
   determine, in an instance in which the watercraft has moved to a second location, a second depth corresponding to the bottom surface of the body of water at the second location;
   determine, based on the determined second depth and the beam shape corresponding to the at least one sonar transducer, a second sonar beam footprint corresponding to a projection of the beam shape at the determined second depth; and
   cause, on the display, presentation of the second sonar beam footprint on the chart and relative to the representation of the watercraft.

16. A method for presenting marine data, the method comprising:
   causing, on a display, presentation of a chart including at least a portion of a body of water;
   causing, on the display, presentation of a representation of a watercraft at a position in the chart corresponding to a current location of the watercraft;
   determining a depth corresponding to a bottom surface of the body of water at the current location of the watercraft;
   determining, based on the determined depth and a beam shape corresponding to at least one sonar transducer associated with the watercraft, a sonar beam footprint with a size corresponding to a two-dimensional projection of the beam shape onto the bottom surface at the determined depth, wherein the size of the determined sonar beam footprint varies based on the determined depth at the current location, wherein the at least one sonar transducer is configured to emit one or more sonar beams into an underwater environment of the body of water in a direction relative to the watercraft, wherein the one or more sonar beams are each emitted according to the beam shape;
   causing, on the display, presentation of the sonar beam footprint on the chart in an updating plan view and relative to the representation of the watercraft so as to visually indicate sonar beam coverage of the at least one sonar transducer relative to the watercraft and within the underwater environment, wherein the sonar beam footprint presented on the chart is different than generated sonar imagery and is an indication of the two-dimensional projection of the beam shape on the bottom surface at the determined depth;
   determining, based on sonar data from the one or more sonar beams and the sonar beam footprint, an indicator position within the sonar beam footprint that corresponds to an actual position of an object within the one or more sonar beams relative to the watercraft as the object moves within the one or more sonar beams by tracking the object as additional sonar data is captured by the at least one sonar transducer; and
   causing, on the display, presentation of an object indicator at the corresponding determined indicator positions within the sonar beam footprint so as to visually indicate a relative position of the object to the watercraft on the chart as the object moves within the one or more sonar beams, wherein the object indicator is different than the generated sonar imagery and corresponds to the object within the sonar data received by the at least one sonar transducer at the current location.

17. The method of claim 16, wherein the sonar beam footprint is a first sonar beam footprint and the current location is a first location, wherein the method further comprises:
   determining, in an instance in which the watercraft has moved to a second location, a second depth corresponding to the bottom surface of the body of water at the second location;
   determining, based on the determined second depth and the beam shape corresponding to the at least one sonar transducer, a second sonar beam footprint corresponding to a projection of the beam shape at the determined second depth; and causing, on the display, presentation of the second sonar beam footprint on the chart and relative to the representation of the watercraft.

18. The system of claim 1, wherein the sonar beam footprint presented on the chart does not include sonar imagery presented therein.

19. The marine electronic device of claim 14, wherein the sonar beam footprint presented on the chart does not include sonar imagery presented therein.

20. The method of claim 16, wherein the sonar beam footprint presented on the chart does not include sonar imagery presented therein.

* * * * *